(12) United States Patent
Takano

(10) Patent No.: US 10,368,280 B2
(45) Date of Patent: Jul. 30, 2019

(54) METHOD FOR CONTROLLING HANDOVER, USER EQUIPMENT, BASE STATION, AND RADIO COMMUNICATION SYSTEM

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/144,236

(22) Filed: May 2, 2016

(65) Prior Publication Data

US 2016/0249260 A1 Aug. 25, 2016

Related U.S. Application Data

(63) Continuation of application No. 13/579,398, filed as application No. PCT/JP2011/051051 on Jan. 21, 2011, now Pat. No. 9,351,204.

(30) Foreign Application Priority Data

Feb. 25, 2010 (JP) .................................. 2010-040464

(51) Int. Cl.
H04L 1/00 (2006.01)
H04L 5/00 (2006.01)
(Continued)

(52) U.S. Cl.
CPC ........... *H04W 36/08* (2013.01); *H04L 1/0046* (2013.01); *H04L 5/0007* (2013.01);
(Continued)

(58) Field of Classification Search
CPC . H04W 36/0083; H04W 36/30; H04W 36/14; H04W 36/00; H04W 36/0061; H04W 36/0072
(Continued)

(56) References Cited

U.S. PATENT DOCUMENTS 8,848,601 B2 9/2014 Cai et al.
2009/0316659 A1 12/2009 Lindoff et al.
(Continued)

FOREIGN PATENT DOCUMENTS

| EP | 2 190 241 A1 | 5/2010 |
| JP | 2009 232293 | 10/2009 |
| WO | 2009/155480 | 12/2009 |

OTHER PUBLICATIONS

R2-093722, 3GPP TSG RAN WG2 Meeting #66bis Los Angeles, USA, Jun. 29-Jul. 3, 2009.*

(Continued)

*Primary Examiner* — Jung H Park
(74) *Attorney, Agent, or Firm* — XSENSUS LLP

(57) ABSTRACT

Provided is a method for controlling a handover from a first base station to a second base station by a user equipment that performs radio communication over a communication channel formed by aggregating a plurality of component carriers, wherein scheduling information on each component carrier is transmitted to the user equipment according to either of a straight scheduling method and a cross scheduling method, and the method includes at the first base station, commanding first the user equipment to perform a handover from the first base station to the second base station on a second component carrier to be operated according to the straight scheduling method in the second base station, when it is determined that a handover on a first component carrier following the cross scheduling method is to be executed.

13 Claims, 19 Drawing Sheets

(51) Int. Cl.
*H04W 36/00* (2009.01)
*H04W 36/08* (2009.01)
*H04W 72/08* (2009.01)
*H04W 72/12* (2009.01)

(52) U.S. Cl.
CPC ....... *H04L 5/0053* (2013.01); *H04W 36/0072* (2013.01); *H04W 72/082* (2013.01); *H04W 72/12* (2013.01)

(58) Field of Classification Search
USPC .................................................. 370/252, 331
See application file for complete search history.

(56) References Cited

U.S. PATENT DOCUMENTS

| | | | | |
|---|---|---|---|---|
| 2010/0020852 | A1* | 1/2010 | Erell | H04L 1/0026 375/141 |
| 2010/0165845 | A1* | 7/2010 | Lott | H04L 47/10 370/235 |
| 2010/0215011 | A1* | 8/2010 | Pan | H04L 5/0064 370/329 |
| 2010/0227569 | A1* | 9/2010 | Bala | H04L 5/0007 455/73 |
| 2010/0290435 | A1 | 11/2010 | Kazmi et al. | |
| 2010/0303011 | A1 | 12/2010 | Pan et al. | |
| 2011/0170496 | A1* | 7/2011 | Fong | H04L 5/0053 370/329 |
| 2011/0205976 | A1* | 8/2011 | Roessel | H04L 5/001 370/329 |
| 2011/0268032 | A1* | 11/2011 | Kim | H04L 1/1671 370/328 |
| 2011/0280223 | A1* | 11/2011 | Maeda | H04W 4/08 370/335 |
| 2011/0292911 | A1* | 12/2011 | Uemura | H04W 36/0072 370/331 |
| 2012/0004010 | A1 | 1/2012 | Tamura et al. | |
| 2012/0115468 | A1 | 5/2012 | Lindoff et al. | |
| 2012/0157103 | A1 | 6/2012 | Frenger et al. | |
| 2012/0202501 | A1 | 8/2012 | Morioka et al. | |
| 2012/0250559 | A1 | 10/2012 | Wu et al. | |
| 2013/0021990 | A1 | 1/2013 | Roessel et al. | |
| 2013/0153298 | A1* | 6/2013 | Pietraski | E21B 7/04 175/45 |
| 2013/0242730 | A1 | 9/2013 | Pelletier et al. | |

OTHER PUBLICATIONS

3GPP TSG RAN WG1 Meeting #58bis R1-093973; Title: Extension carrier operation Miyazaki, Japan, Oct. 12-15, 2009.*
3GPP TSG-RAN WG1 Meeting #58bis ; R1-093939; Title :Extension carrier and PDCCH-less operation Miyazaki, Japan, Oct. 12-16, 2009.*
3GPP TSG RAN WG2 Meeting #66bis R2-093722; Title: Handover for Carrier Aggregation Los Angeles, USA, Jun. 29-Jul. 3, 2009.*
3GPP TSG RAN WG1 Meeting #58bis R1-093973; Title: Extension carrier operation 2009.*
3GPP TSG RAN WG1 #58bis Meeting;Miyazaki, Japan, Oct. 12-16, 2009 Issues with Cross-Component Carrier Scheduling; NPL R1-093903.*
3GPP TSG RAN WG2 Meeting #66bis R2-093722, "Handover for Carrier Aggregation," CATT, Total 3 pages, (Jun. 29 to Jul. 3, 2009).
3GPP TSG-RAN WG1 Meeting #58bis R1-093939, "Extension carrier and PDCCH-less operation," Panasonic, Total 6 pages, (Oct. 12 to 16, 2009).
3GPP TSG-RAN2#68 R2-096976, "Non-accessible carriers in LTE-A," NTT DOCOMO, Inc., Total 7 pages, (Nov. 9-13, 2009).
Measurements for carrier aggregation, Ericsson, ST-Ericsson, 3GPP TSG-RAN WG2 #68bis, URL: http://www.3gpp.org/ftp/tsg_ran/wg2_rl2/TSGR2_68bis/Docs/R2-100122.zip, Tdoc R2-100122, Jan. 2010, pp. 1-8 and Cover Page.
"PDCCH carrier indication field for cross-carrier scheduling", Texas Instruments, 3GPP TSG RAN WG1 #59, URL: http://www.3gpp.orp/ftp/tsg_ran/WG1_RL1/TSGR1_59/Docs/R1-094761.zip, R1-094761, Nov. 2009, pp. 1-4 and Cover Page.
3GPP TSG RAN WG2 Meeting #67 R2-094731, "Intra LTE-A UE Handover Procedure inter-eNB for CA," Huawei, Total 5 pages, (Aug. 24 to 28, 2009).
3GPP TSG RAN WG2 Meeting #69, San Francisco, USA, Feb. 22-26, 2010, CATT, "Functionality of Anchor Cell", (3 pgs).
European Extended Search Report dated Dec. 9, 2015 in European Application No. 11747102.9 (10 pages).
International Search Report dated Feb. 15, 2011 in PCT/JP11/51051 Filed Jan. 21, 2011.
Office Action dated Jul. 22, 2014 in Japanese Patent Application No. 2013-259078 (with English language translation).
"L3 anchor carrier", CATT, 3GPP TSG RAN WG2 Meeting #66bis, URL: http://www.3gpp.org/ftp/tsg_ran/wg2_rl2/TSGR2_66bis/Docs/R2-093721.zip , R2-093721, 2009, 2 Pages and Cover Page.
"PDCCH carrier indication field for cross-carrier scheduling", Texas Instruments, 3GPP TSG RAN WG1 #59, URL: http://www.3gpp.org/ftp/tsg_ran/WG1_RL1/TSGR1_59/Docs/R1-094761.zip, R1-094761, Nov. 2009, pp. 1-4 and Cover Page.
"Issues with cross-component carrier scheduling", Nokia, Nokia Siemens Networks, 3GPP TSG RAN WG1 Meeting #59, URL: http://www.3gpp.org/ftp/tsg_ran/WG1_RL1/TSGR1_59/Docs/R1-094645.zip, R1-094645, Nov. 2009, 5 Pages and Cover Page.
"Component carrier indication for bandwidth extension in LTE-A", Alcatel-Lucent, 3GPP TSG-RAN WG1 #58, URL: http://www.3gpp.org/ftp/tsg_ran/WG1_RL1/TSGR1_58/Docs/R1-093362.zip, R1-093362, Aug. 2009, pp. 1-5 and Cover Page.
Office Action dated Oct. 20, 2016 in Korean Patent Application No. 10-2012-7021438 (with English language translation).
"Extension carrier operation" Source: Motorola, Agenda item: 15.4, 3GPP TSG RAN WG1 Meeting #58bis, R1-093973, Miyazaki, Japan, Oct. 12-16, 2009, 2 Pages.
Combined Office Action and Search Report dated Feb. 28, 2018 in Chinese Patent Application No. 201510629256.3 (with English language translation), 17 pages.

* cited by examiner

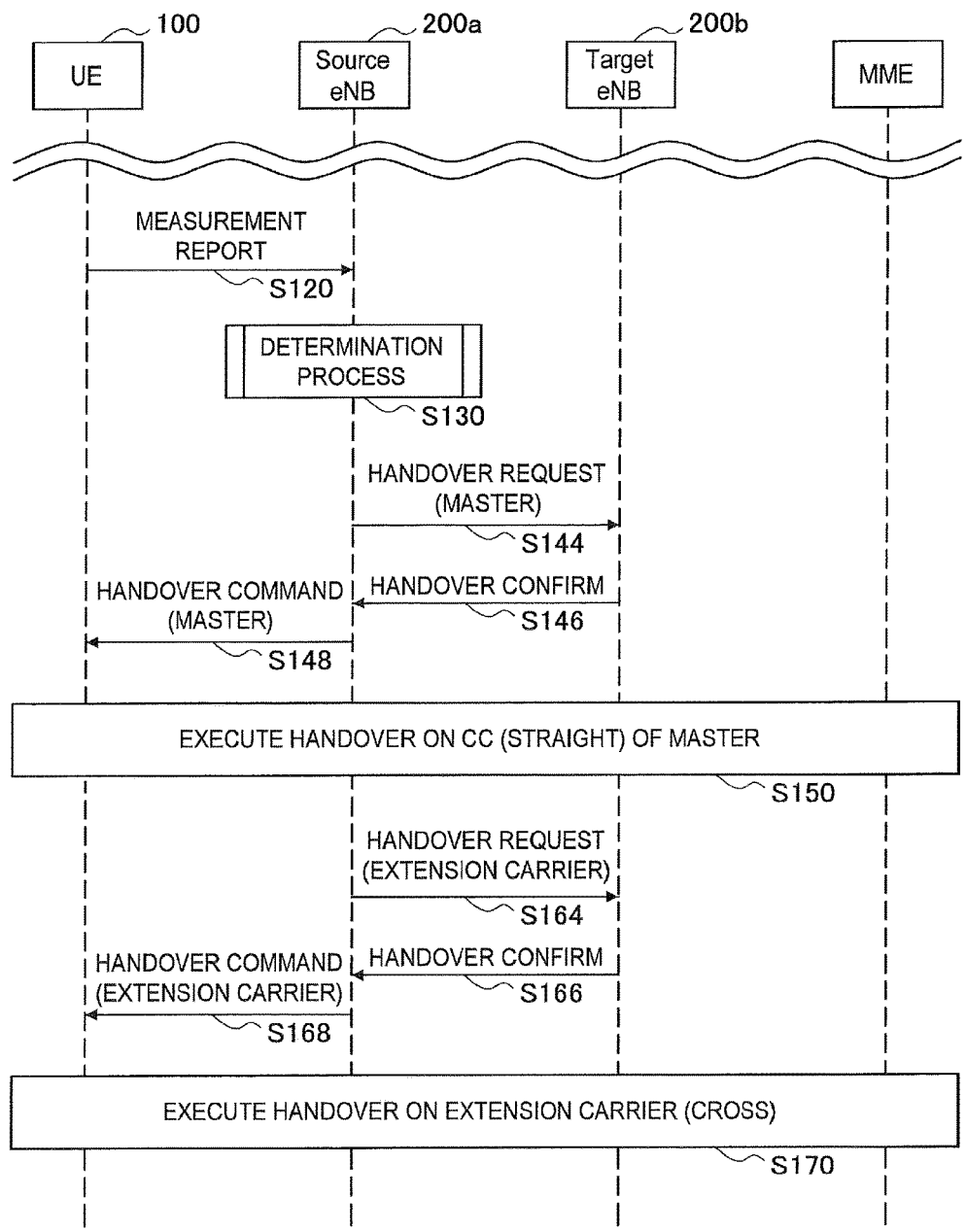

METHOD FOR CONTROLLING HANDOVER, USER EQUIPMENT, BASE STATION, AND RADIO COMMUNICATION SYSTEM

CROSS-REFERENCE TO RELATED APPLICATION

The application is a continuation of U.S. application Ser. No. 13/579,398, filed Aug. 16, 2012, which is a national stage application of PCT/JP2011/051051 filed Jan. 21, 2011, and claims priority to Japanese Patent Application No. 2010-040464 filed Feb. 25, 2010, the contents of each of which are hereby incorporated by reference.

TECHNICAL FIELD

The present invention relates to a method for controlling a handover, a user equipment, a base station, and a radio communication system.

BACKGROUND ART

In Long Term Evolution-Advanced (LTE-A), which is the next-generation cellular communication standard that is discussed in Third Generation Partnership Project (3GPP), introduction of technology called carrier aggregation (CA) has been studied. The carrier aggregation is technology that forms a communication channel between a user equipment (UE) and a base station (BS, or evolved Node B (eNB)) by aggregating a plurality of frequency bands that are supported in LTE, for example, and thereby improves communication throughput. Each frequency band included in one communication channel by the carrier aggregation is called a component carrier (CC). The bandwidths of frequency bands that are available in LTE are 1.4 MHz, 3.0 MHz, 5.0 MHz, 10 MHz, 15 MHz, and 20 MHz. Accordingly, if five bands of 20 MHz are aggregated as component carriers, a communication channel of 100 MHz in total can be formed.

Component carriers that are included in one communication channel in the carrier aggregation are not necessarily contiguous to one another in the frequency direction. The mode in which component carriers are arranged contiguous to one another in the frequency direction is called a contiguous mode. On the other hand, the mode in which component carriers are arranged not contiguous to one another is called a non-contiguous mode.

Further, in the carrier aggregation, the number of component carriers in an uplink and the number of component carriers in a downlink are not necessarily equal. The mode in which the number of component carriers in an uplink and the number of component carriers in a downlink are equal is called a symmetric mode. On the other hand, the mode in which the number of component carriers in an uplink and the number of component carriers in a downlink are not equal is called an asymmetric mode. For example, in the case of using two component carriers in an uplink and three component carriers in a downlink, it is asymmetric carrier aggregation.

In radio communication of a conventional cellular system involving the carrier aggregation, allocation information of communication resources (that is, scheduling information) is transmitted from a base station from each user equipment over a downlink control channel (for example, PDCCH: Physical Downlink Control Channel). In radio communication not involving the carrier aggregation, the scheduling information can be transmitted according to two kinds of methods. A first method is a method in which a conventional method is applied to individual component carriers as is. In other words, in the first method, a control channel for transmitting scheduling information on data transmission in a certain component carrier is set inside the corresponding component carrier. In this disclosure, the first method is referred to as a straight scheduling method. On the other hand, in a second method, a control channel for transmitting scheduling information on data transmission in a certain component carrier is set inside a component carrier different from the corresponding component carrier. According to the second method, when communication resources used for transmission of scheduling information are aggregated, a ratio of overhead occupied by communication resources is reduced. Thus, the second method can achieve a higher throughput than the first method. In this disclosure, the second method is referred to as a "cross scheduling method." The straight scheduling method and the cross scheduling method can be complexly used within one communication channel. In other words, one channel configuring a communication channel may be operated by the cross scheduling method, and another channel may be operated by the straight scheduling method.

A handover, which is a basic technique for achieving the mobility of a user equipment in the cellular communication standard, is one of important subjects in LTE-A. In LTE, a user equipment measures a communication quality over a channel with a serving base station (a currently connected base station) and communication qualities with peripheral base stations and transmits a measurement report containing measurements to the serving base station. Receiving the measurement report, the serving base station determines whether to execute a handover based on the measurements contained in the report. Then, if it is determined that a handover is to be executed, a handover is carried out among a source base station (the serving base station before a handover), the user equipment, and a target base station (a serving base station after a handover) in accordance with a prescribed procedure (e.g. cf. Patent Literature 1 below).

CITATION LIST

Patent Literature

Patent Literature 1: JP 2009-232293A

SUMMARY OF INVENTION

Technical Problem

However, no case has been reported where active consideration is given to how to carry out a handover procedure in a radio communication involving the carrier aggregation.

In the existing handover procedure disclosed in Patent Literature 1, processing such as a handover request, approval of the request, issuance of a handover command, and random access to a target base station is performed under the assumption that one communication channel is configured with one component carrier. When the carrier aggregation technique is introduced, since component carriers are assumed to differ in the channel quality from each other, it is desirable to execute a handover for each component carrier. However, under the circumstances in which the cross scheduling method is employed, a data channel used to perform data transmission and a control channel used to transmit scheduling information related to data transmission can be located in different component carriers. For this reason, when a handover procedure of each component carrier is not appropriately controlled, data loss may occur due to loss or mismatching of scheduling information or the like.

In this regard, the present invention aims to provide a method for controlling a handover, a user equipment, a base station, and a radio communication system, which are novel and improved and are capable of performing a handover with no data loss even under the circumstances in which the cross scheduling method is employed.

Solution to Problem

According to an aspect of the present invention, there is provided a method for controlling a handover from a first base station to a second base station by a user equipment that performs radio communication over a communication channel formed by aggregating a plurality of component carriers, wherein scheduling information on each component carrier is transmitted to the user equipment according to either of a straight scheduling method and a cross scheduling method, and the method includes, at the first base station, commanding first the user equipment to perform a handover from the first base station to the second base station on a second component carrier to be operated according to the straight scheduling method in the second base station, when it is determined that a handover on a first component carrier following the cross scheduling method is to be executed.

Further, the first base station may command the user equipment to perform a handover on the second component carrier in which a channel for transmitting scheduling information on the first component carrier is positioned before a handover on the first component carrier.

Further, the method may further include, at the first base station, commanding the user equipment to perform a handover on the first component carrier.

Further, the first component carrier and the second component carrier may be the same component carrier, and the method may further include, at the first base station, changing a scheduling information transmission method on the first component carrier from the cross scheduling method to the straight scheduling method before a first handover is executed.

Further, the first base station may change the scheduling information transmission method on the first component carrier from the cross scheduling method to the straight scheduling method according to a change request of the scheduling information transmission method from a user equipment that has executed measurement.

Further, the first base station may change the scheduling information transmission method on the first component carrier from the cross scheduling method to the straight scheduling method after a handover request is confirmed by the second base station.

Further, the first component carrier and the second component carrier may be the same component carrier, and the second component carrier may be operated according to the straight scheduling method in the second base station after a handover from the first base station to the second base station is performed.

Further, according to another aspect of the present invention, there is provided a user equipment which includes a radio communication unit that performs radio communication with a base station over a communication channel formed by aggregating a plurality of component carriers, a control unit that controls a handover from a first base station to a second base station by the radio communication unit, and a quality measuring unit that measures a channel quality of the communication channel between the user equipment and the first base station, wherein scheduling information on each component carrier is transmitted according to either of a straight scheduling method and a cross scheduling method, and when it is determined that a handover on a first component carrier following the cross scheduling method is to be executed, a handover from the first base station to the second base station on a second component carrier to be operated according to the straight scheduling method in the second base station is first executed according to a command from the first base station.

Further, according to another aspect of the present invention, there is provided a base station which includes a radio communication unit that performs radio communication with a user equipment over a communication channel formed by aggregating a plurality of component carriers, and a control unit that controls a handover to another base station by the user equipment, wherein scheduling information on each component carrier is transmitted according to either of a straight scheduling method and a cross scheduling method, and when it is determined that a handover on a first component carrier following the cross scheduling method is to be executed, the control unit commands first the user equipment to perform a handover to the other base station on a second component carrier to be operated according to the straight scheduling method in the other base station.

Further, according to another aspect of the present invention, there is provided a radio communication system which includes a user equipment that performs radio communication over a communication channel formed by aggregating a plurality of component carriers, a first base station that provides the user equipment with a service over the communication channel, and a second base station that is a target of a handover from the first base station by the user equipment, wherein scheduling information on each component carrier is transmitted according to either of a straight scheduling method and a cross scheduling method, and when it is determined that a handover on a first component carrier following the cross scheduling method is to be executed, the first base station commands first the user equipment to perform a handover on a second component carrier to be operated according to the straight scheduling method in the second base station.

Advantageous Effects of Invention

As described above, a method for controlling a handover, a user equipment, a base station, and a radio communication system according to the present invention can perform a handover with no data loss even under the circumstances in which cross scheduling can be performed.

BRIEF DESCRIPTION OF DRAWINGS

FIG. 10 is a sequence chart showing an example of the flow of a handover procedure according to the first embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Preferred embodiments of the present invention will be described hereinafter in the following order.
1. Description of Related Art
1-1. Handover Procedure
1-2. Structure of Communication Resources
1-3. Scheduling Information Transmission Method
2. Outline of Radio Communication System
3. Description of First Embodiment
3-1. Exemplary Configuration of User Equipment
3-2. Exemplary Configuration of Base Station
3-3. Flow of Process
3-4. Summary of First Embodiment
4. Description of Second Embodiment
4-1. Exemplary Configuration of User Equipment
4-2. Exemplary Configuration of Base Station
4-3. Flow of Process
4-4. Summary of Second Embodiment
5. Description of Third Embodiment
5-1. Exemplary Configuration of User Equipment
5-2. Exemplary Configuration of Base Station
5-3. Flow of Process
5-4. Summary of Third Embodiment

1. Description of Related Art (1-1. Handover Procedure)

Figure 1:
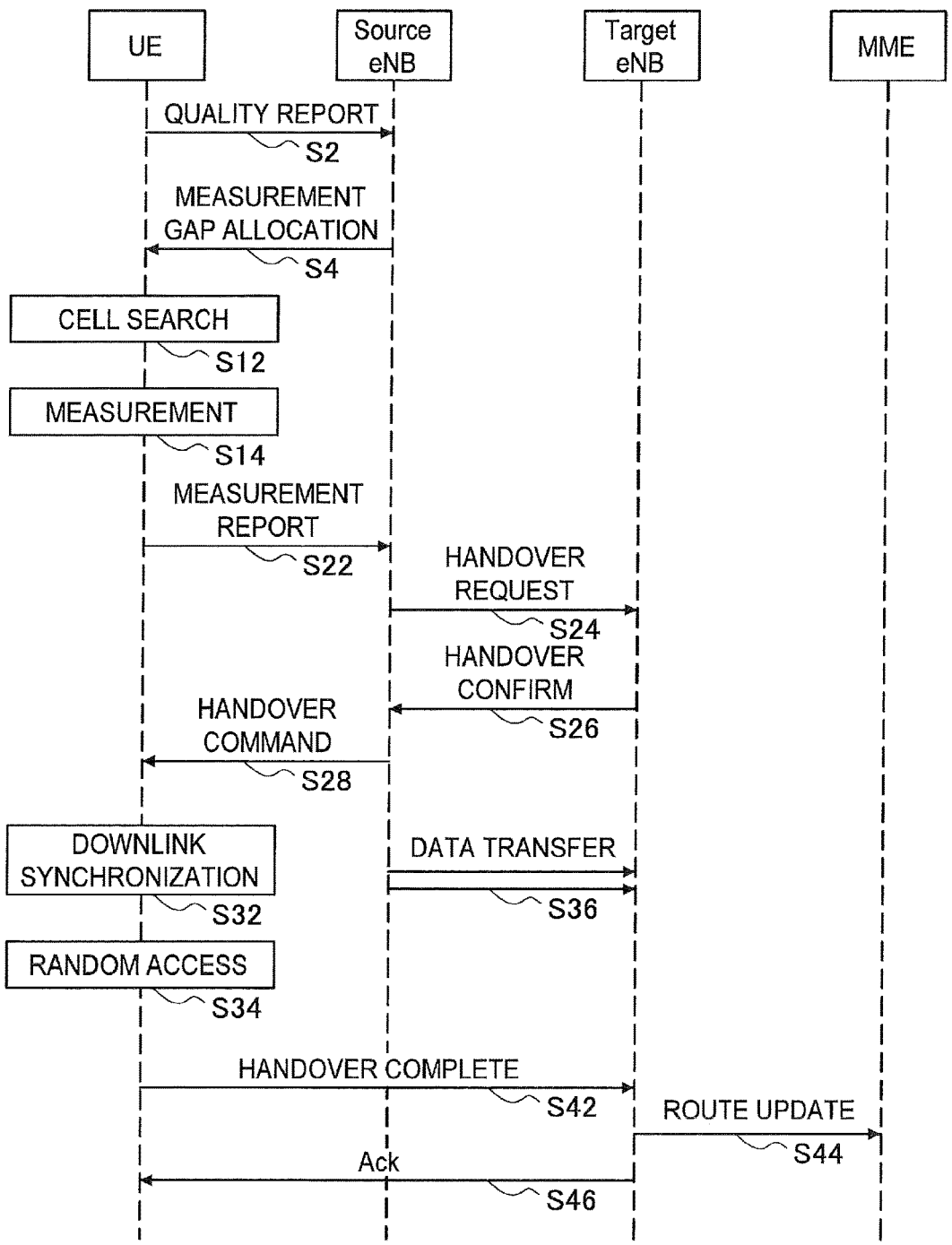
FIG. 1 is a sequence chart to describe a flow of a typical handover procedure.

A technique related to the present invention is described hereinafter with reference to FIGS. 1 and 2. FIG. 1 shows a flow of a handover procedure in conformity with LTE in a radio communication not involving the carrier aggregation as an example of a typical handover procedure. In this example, a user equipment (UE), a source base station (source eNB), a target base station (target eNB), and a mobility management entity (MIME) are involved in the handover procedure.

As a preliminary step toward a handover, the user equipment first reports the channel quality of a communication channel between the user equipment and the source base station to the source base station (step S2). The channel quality may be reported on a regular basis or when the channel quality falls below a predetermined reference value. The user equipment can measure the channel quality of the communication channel with the source base station by receiving a reference signal contained in a downlink channel from the source base station.

Then, the source base station determines the needs of measurement based on the quality report received from the user equipment and, if measurement is necessary, allocates measurement gaps to the user equipment (step S4).

Then, the user equipment searches for a downlink channel from a peripheral base station (i.e. performs cell search) during the periods of the allocated measurement gaps (step S12). Note that the user equipment can recognize a peripheral base station to search according to a list that is provided in advance from the source base station.

When the user equipment acquires synchronization with a downlink channel, the user equipment performs measurement by using a reference signal contained in the downlink channel (step S14). During this period, the source base station restricts an allocation of data communication related to the user equipment so as to avoid occurrence of data transmission by the user equipment.

Upon completion of the measurement, the user equipment transmits a measurement report containing measurements to the source base station (step S22). The measurements contained in the measurement report may be the average value or the central value of measured values over a plurality of times of measurement or the like. Further, the measurements may contain data about a plurality of frequency bands.

Receiving the measurement report, the source base station determines whether or not to execute a handover based on the contents of the measurement report. For example, when the channel quality of another base station in the periphery is higher than the channel quality of the source base station by a predetermined threshold or greater, it can be determined that a handover is necessary. In this case, the source base station determines to carry out a handover procedure with the relevant another base station as a target base station, and transmits a handover request message to the target base station (step S24).

Receiving the handover request message, the target base station determines whether it is possible to accept the user equipment according to the availability of a communication service offered by itself or the like. When it is possible to accept the user equipment, the target base station transmits a handover request confirm message to the source base station (step S26).

Receiving the handover request confirm message, the source base station transmits a handover command to the user equipment (step S28). Then, the user equipment acquires synchronization with the downlink channel of the target base station (step S32). After that, the user equipment makes a random access to the target base station by using a random access channel in a given time slot (step S34). During this period, the source base station forwards data addressed to the user equipment to the target base station (step S36). Then, after success in the random access, the user equipment transmits a handover complete message to the target base station (step S42).

Receiving the handover complete message, the target base station requests the MME to perform route update for the user equipment (step S44). Upon updating the route of user data by the MME, the user equipment becomes able to communicate with another device through a new base station (i.e. the target base station). Then, the target base station transmits acknowledgement to the user equipment (step S46). A series of handover procedure thereby ends.

(1-2. Structure of Communication Resource)

Figure 2:
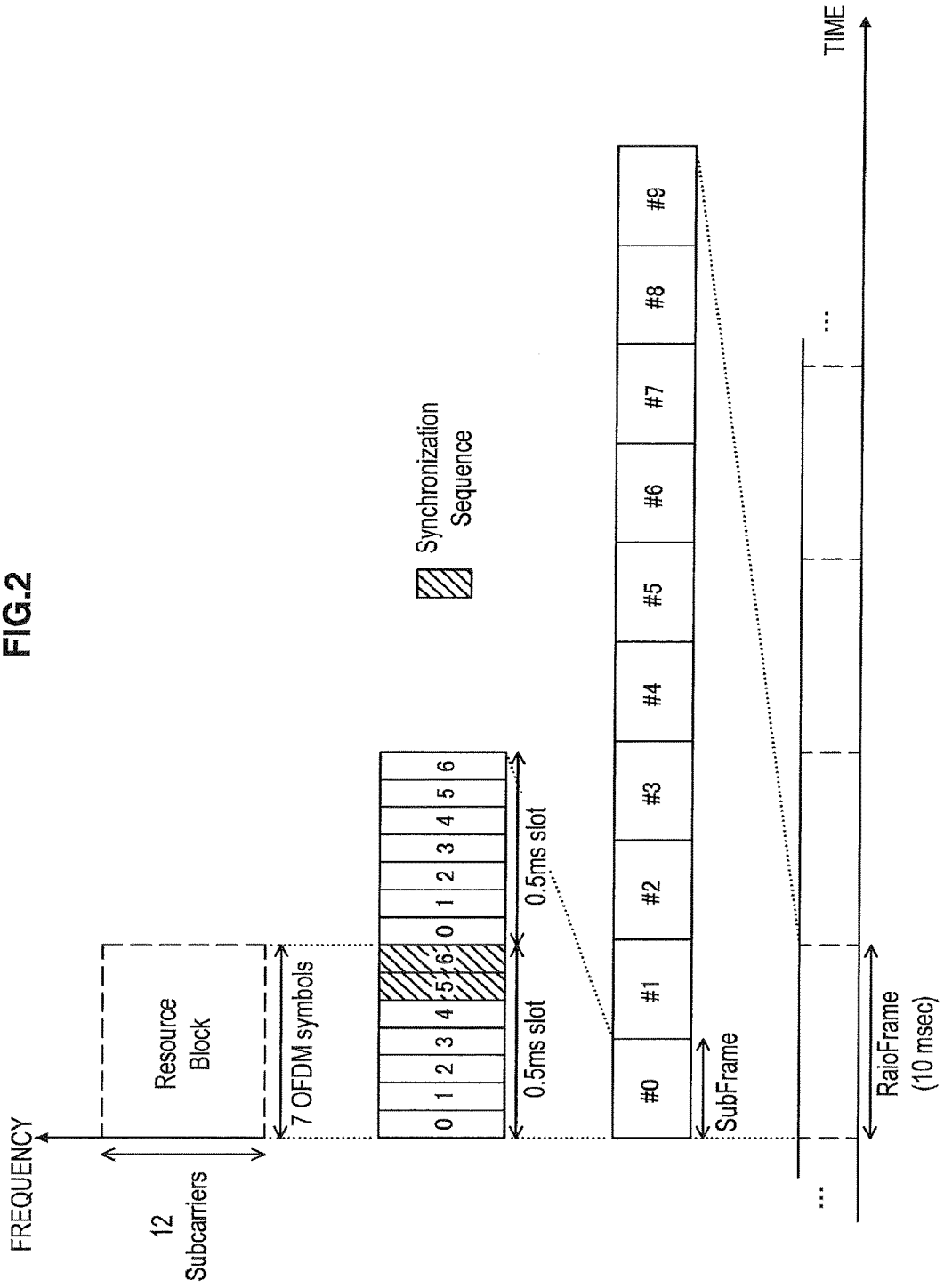
FIG. 2 is an explanatory view to describe an example of a structure of communication resources.

FIG. 2 shows a structure of communication resources in LTE as an example of a structure of communication resources to which the present invention is applicable. Referring to FIG. 2, the communication resources in LTE are segmented in the time direction into radio frames each having a length of 10 msec. One radio frame includes ten sub-frames, and one sub-frame is made up of two 0.5 ms slots. Further, one 0.5 ms slot typically includes seven OFDM symbols in the time direction. One unit of communication resources including seven OFDM symbols in the time direction and 12 sub carriers in the frequency direction is referred to as a resource block. In LTE, communication resources are allocated to each user equipment in the time direction in units of sub frames or in units of resource blocks. Further, one unit of communication resources corresponding to one OFDM symbol in the time direction and one sub carrier in the frequency direction is referred to as a resource element. In other words, one resource block corresponds 84 (=7×12) resource elements. In conditions of the same bandwidth and the same time length, as the number of resource blocks allocated for data communication increases, the throughput of data communication increases.

Further, a synchronization sequence is included in a resource block at a predetermined position (typically, at the center of a band) in the frequency direction. As the synchronization sequence, two kinds of synchronization sequences, that is, a primary synchronization sequence (PSS) and a secondary synchronization sequence (SSS), are used. A user equipment that has received the two kinds of synchronization sequences in a cell search may discriminate between base stations and acquire synchronization with a specific base station. The two kinds of synchronization sequences are arranged on sixth and seventh OFDM symbols #5 and #6 of one sub fame in the time direction. Further, an OFDM symbol following the synchronization sequences may be used as a broadcast channel for transmission of system information.

Further, a predetermined resource element in each resource block is used for transmission of a reference signal. A user equipment that has received the reference signal may measure the communication quality in units of resource blocks. Further, a scheduler of a base station decides allocation of communication resources to a user equipment according to the communication quality of each resource block that is measured by a user equipment in the downlink and measured by a base station in the uplink.

(1-3. Scheduling Information Transmission Method)

Figure 3:
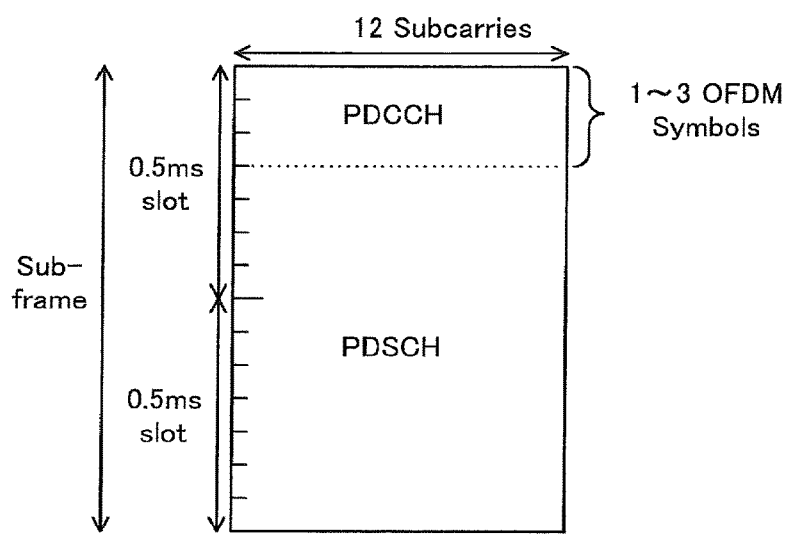
FIG. 3 is an explanatory view to describe an example of an arrangement of a control channel included in communication resources.

FIG. 3 shows an arrangement of a control channel as an example of an arrangement of a control channel included in communication resources. Unlike FIG. 2, in FIG. 3, a vertical axis represents a time direction, and a horizontal axis represents a frequency direction. Referring to FIG. 3, a communication resource of 12 sub carriers×1 sub frame is shown. 1 sub frame includes 14 OFDM symbols in the time direction. In these communication resources, a control channel used to transmit scheduling information, that is, a PDCCH, is arranged in a maximum of 3 OFDM symbols at the head of a sub frame. In addition to the scheduling information, information used to designate a modulation scheme, power control information, and the like may be transmitted over the PDCCH. A user equipment recognizes communication resources used for each device to transmit or receive data with reference to the scheduling information on the control channel. Transmission and reception of data is performed over a physical downlink shared channel (PDSCH) which is a data channel arranged in remaining OFDM symbols of the sub frame.

Here, in radio communication involving the carrier aggregation, a plurality of component carriers configure one communication channel. Typically, each component carrier includes a control channel. However, in order to improve the throughput by allocating more resource blocks for data communication (that is, by reducing the overhead), a technique called cross scheduling (or cross carrier scheduling) which will be described later with reference to FIG. 4 may be used.

Figure 4:
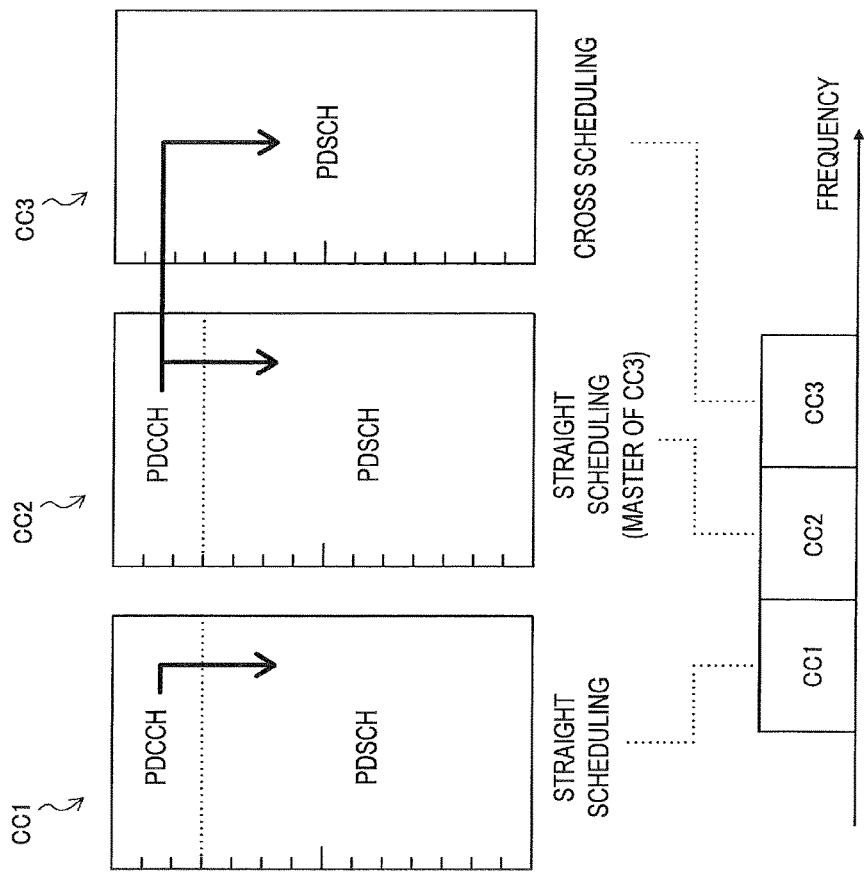
FIG. 4 is an explanatory view to describe two kinds of scheduling information transmission methods.

FIG. 4 is an explanatory view to describe two kinds of scheduling information transmission methods in radio communication involving the carrier aggregation. Referring to FIG. 4, 3 component carriers CC1 to CC3 configure one communication channel. Of these, each of the component carriers CC1 and CC2 includes a control channel (PDCCH). Scheduling information for data communication in the component carrier CC1 is transmitted over the control channel of the component carrier CC1. Scheduling information for data communication in the component carrier CC2 is transmitted over the control channel of the component carrier CC2. Meanwhile, the component carrier CC3 does not include a control channel. Scheduling information for data communication in the component carrier CC3 is transmitted over the control channel of the component carrier CC2. Thus, in the example of FIG. 4, the component carriers CC1 and CC2 follow the straight scheduling method, and the component carrier CC3 follows the cross scheduling method. The component carrier following the cross scheduling method is also referred to as an extension carrier. Further, in this disclosure, a component carrier including a control channel for an extension carrier is referred to as a master of the extension carrier. In the example of FIG. 4, the component carrier CC2 is the master of the component carrier CC3.

2. Outline of Radio Communication System

Figure 5:
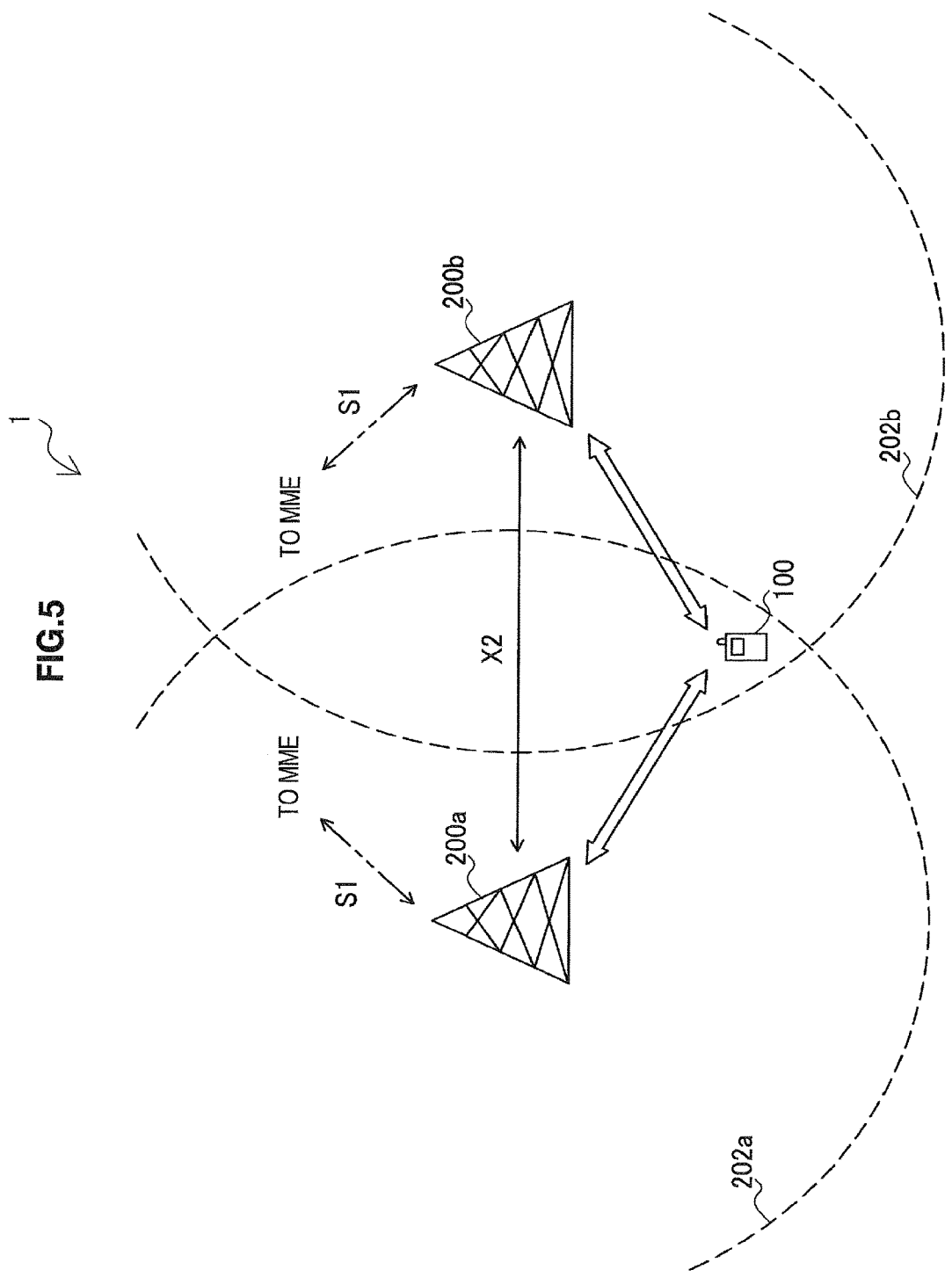
FIG. 5 is a schematic view showing an outline of a radio communication system according to an embodiment of the present invention.

FIG. 5 is a schematic view showing an outline of a radio communication system 1 according to an embodiment of the present invention. Referring to FIG. 5, the radio communication system 1 includes a user equipment 100, a base station 200a and a base station 200b. It is assumed that the base station 200a is a serving base station for the user equipment 100.

The user equipment 100 is located inside a cell 202a where a radio communication service is provided by the base station 200a. The user equipment 100 can perform a data communication with another user equipment (not shown) via the base station 200a over a communication channel formed by aggregating a plurality of component carriers (i.e. by carrier aggregation). However, because the distance between the user equipment 100 and the base station 200a is not short, there is a possibility that a handover is required for the user equipment 100. Further, the user equipment 100 is located inside a cell 202b where a radio communication service is provided by the base station 200b. Therefore, the base station 200b can be a candidate for a target base station for a handover of the user equipment 100.

The base station 200a can communicate with the base station 200b through a backhaul link (e.g. X2 interface). Various kinds of messages in the handover procedure as described with reference to FIG. 1, scheduling information related to the user equipment belonging to each cell or the like, for example, can be transmitted and received between the base station 200a and the base station 200b. Further, the base station 200a and the base station 200b can communicate with the MME, which is an upper node, through S1 interface, for example.

Here, it is assumed that a need to perform a handover to the base station 200b arises when the user equipment 100 performs radio communication involving the carrier aggregation with the base station 200a. In this case, for example, an attempt to perform a handover is made first on a component carrier having the worst quality between the user equipment 100 and the base station 200a. At this time, however, when the corresponding component carrier is an extension carrier, a handover is performed before a component carrier of a master, and thus data loss may occur due to loss or mismatching of scheduling information. For this reason, it is desirable to control a handover procedure not to cause data loss under the circumstances in which the cross scheduling method is used as in first to third embodiments of the present invention which will be described in detail in the next section.

It should be noted that, when there is no particular need to distinguish between the base station 200a and the base station 200b in the following description of the specification, they are collectively referred to as a base station 200 by omitting the alphabetical letter at the end of the reference symbol. The same applies to the other elements.

3. Description of First Embodiment

Next, a first embodiment of the present invention will be described with reference to FIGS. 6 to 11D.

(3-1. Exemplary Configuration of User Equipment)

Figure 6:
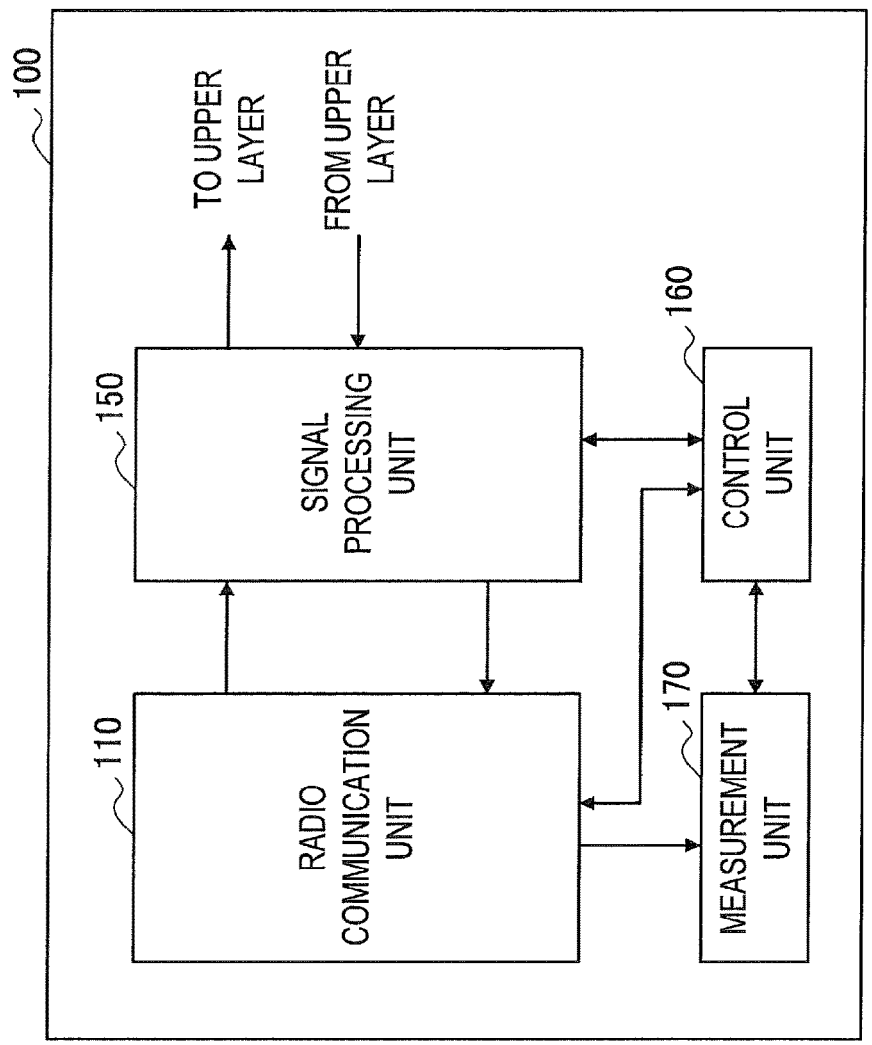
FIG. 6 is a block diagram showing an exemplary configuration of a user equipment according to a first embodiment.

FIG. 6 is a block diagram showing an exemplary configuration of the user equipment 100 according to the present embodiment. Referring to FIG. 6, the user equipment 100 includes a radio communication unit 110, a signal processing unit 150, a control unit 160, and a measurement unit 170.

(Radio Communication Unit)

The radio communication unit 110 performs a radio communication with the base station 200 over a communication channel formed by aggregating a plurality of component carriers with use of the carrier aggregation technology.

Figure 7:
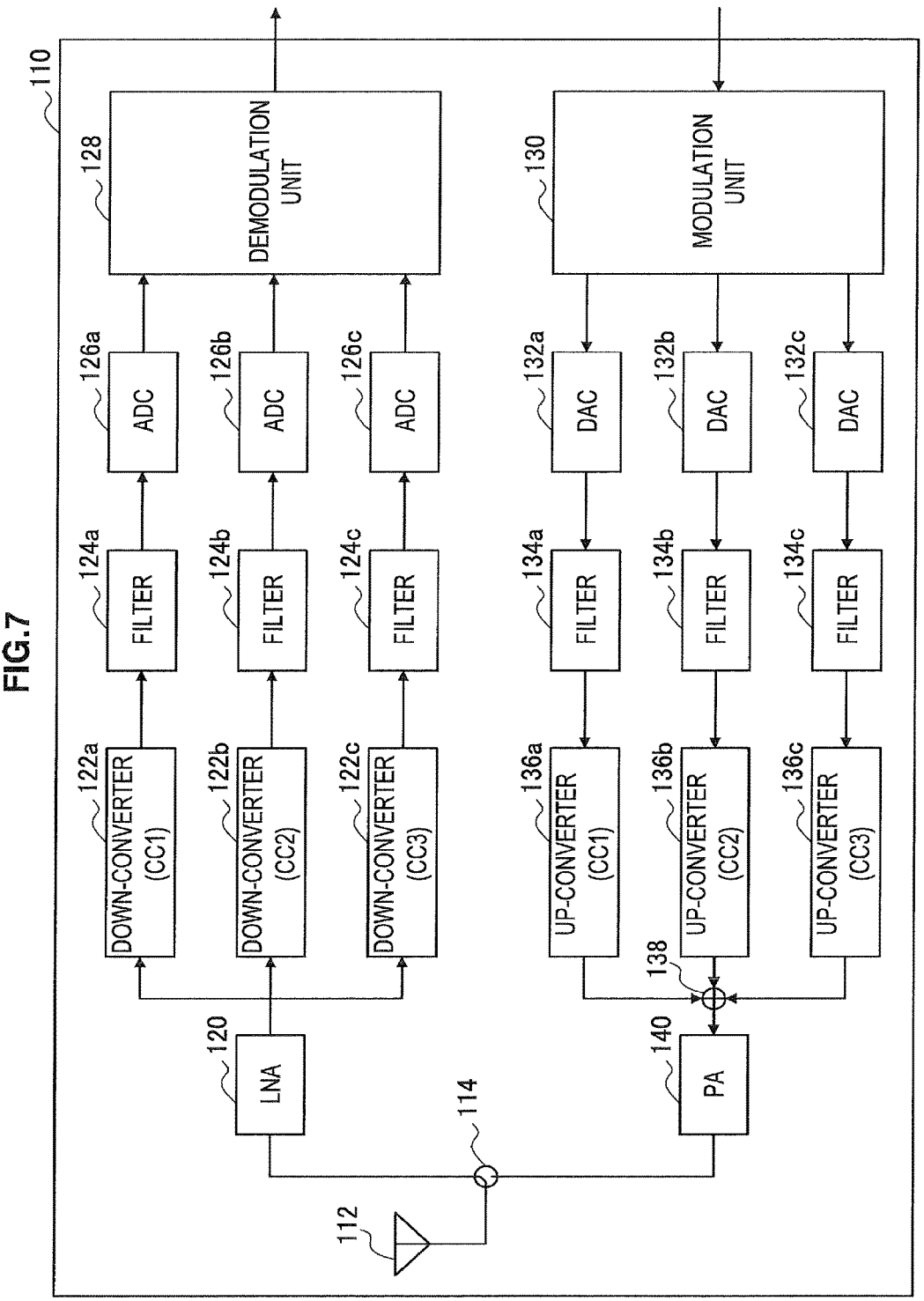
FIG. 7 is a block diagram showing an example of a more detailed configuration of a radio communication unit according to the first embodiment.

FIG. 7 is a block diagram showing an example of a more detailed configuration of the radio communication unit 110. Referring to FIG. 7, the radio communication unit 110 includes an antenna 112, a switch 114, a low noise amplifier (LNA) 120, a plurality of down-converters 122a to 122c, a plurality of filters 124a to 124c, a plurality of analogue-to-digital converters (ADCs) 126a to 126c, a demodulation unit 128, a modulation unit 130, a plurality of digital-to-analogue converters (DACs) 132a to 132c, a plurality of filters 134a to 134c, a plurality of up-converters 136a to 136c, a combiner 138, and a power amplifier (PA) 140.

The antenna 112 receives a radio signal transmitted from the base station 200 and outputs the received signal to the LNA 120 through the switch 114. The LNA 120 amplifies the received signal. The down-converter 122a and the filter 124a separate a baseband signal of the first component carrier (CC1) from the received signal amplified by the LNA 120. Then, the separated baseband signal is converted to a digital signal by the ADC 126a and output to the demodulation unit 128. Likewise, the down-converter 122b and the filter 124b separate a baseband signal of the second component carrier (CC2) from the received signal amplified by the LNA 120. Then, the separated baseband signal is converted to a digital signal by the ADC 126b and output to the demodulation unit 128. Further, the down-converter 122c and the filter 124c separate a baseband signal of the third component carrier (CC3) from the received signal amplified by the LNA 120. Then, the separated baseband signal is converted to a digital signal by the ADC 126c and output to the demodulation unit 128. After that, the demodulation unit 128 generates a data signal by demodulating the baseband signals of the respective component carriers and outputs the data signal to the signal processing unit 150.

Further, when a data signal is input from the signal processing unit 150, the modulation unit 130 modulates the data signal and generates baseband signals of the respective component carriers. Among those baseband signals, the baseband signal of the first component carrier (CC1) is converted to an analog signal by the DAC 132a. Then, a frequency component corresponding to the first component carrier in a transmission signal is generated from the analog signal by the filter 134a and the up-converter 136a. Likewise, the baseband signal of the second component carrier (CC2) is converted to an analog signal by the DAC 132b. Then, a frequency component corresponding to the second component carrier in the transmission signal is generated from the analog signal by the filter 134b and the up-converter 136b. Further, the baseband signal of the third component carrier (CC3) is converted to an analog signal by the DAC 132c. Then, a frequency component corresponding to the third component carrier in the transmission signal is generated from the analog signal by the filter 134c and the up-converter 136c. After that, the generated frequency components corresponding to the three component carriers are combined by the combiner 138, and the transmission signal is formed. The PA 140 amplifies the transmission signal and outputs the transmission signal to the antenna 112 through the switch 114. Then, the antenna 112 transmits the transmission signal as a radio signal to the base station 200.

Although the case where the radio communication unit 110 handles three component carriers is described in FIG. 7, the number of component carriers handled by the radio communication unit 110 may be two, or four or more.

Further, instead of processing the signals of the respective component carriers in the analog region as in the example of FIG. 7, the radio communication unit 110 may process the signals of the respective component carriers in the digital region. In the latter case, at the time of reception, a digital signal converted by one ADC is separated into the signals of the respective component carriers by a digital filter. Further, at the time of transmission, after digital signals of the respective component carriers are frequency-converted and combined, the signal is converted into an analog signal by one DAC. The load of the ADC and the DAC is generally smaller when processing the signals of the respective component carriers in the analog region. On the other hand, when processing the signals of the respective component carriers in the digital region, a sampling frequency for AD/DA conversion is higher, and the load of the ADC and the DAC can thereby increase.

(Signal Processing Unit)

Referring back to FIG. 6, an example of a configuration of the user equipment 100 is further described.

The signal processing unit 150 performs signal processing such as deinterleaving, decoding or error correction on the demodulated data signal that is input from the radio communication unit 110. Then, the signal processing unit 150 outputs the processed data signal to an upper layer. Further, the signal processing unit 150 performs signal processing such as encoding or interleaving on the data signal that is input from the upper layer. Then, the signal processing unit 150 outputs the processed data signals to the radio communication unit 110.

(Control Unit)

The control unit 160 controls the overall functions of the user equipment 100 using a processing device such as a central processing unit (CPU) or a digital signal processor (DSP). For example, the control unit 160 controls a timing of data communication by the radio communication unit 110 for each component carrier according to scheduling information which is received from the base station 200 by the radio communication unit 110. More specifically, for example, the control unit 160 refers to scheduling information on a control channel of a component carrier following the straight scheduling method among component carriers configuring a communication channel between the upper equipment 100 and the base station 200. This scheduling information may include information on an extension carrier following the cross scheduling method in addition to information on a communication resource of the same component carrier. Thus, when information on an extension carrier is included in scheduling information, the control unit 160 controls a timing of data communication on a data channel of an extension carrier according to the corresponding information. Further, the control unit 160 controls a timing of data communication on a data channel of a component carrier following the straight scheduling method according to information on communication resources of the same component carrier as the control channel. In addition, the control unit 160 causes the user equipment 100 to operate in the same way as the user equipment in the handover procedure described with reference to FIG. 1.

(Measurement Unit)

The measurement unit 170 measures the channel quality for each of the component carriers by using a reference signal from the base station 200 according to control from the control unit 160, for example. Further, the measurement unit 170 executes measurement for a handover with respect to each of the component carriers by using the measurement gaps which are allocated by the base station 200. A result of the measurement executed by the measurement unit 170 is converted to a predetermined format for a measurement report by the control unit 160 and transmitted to the base station 200 through the radio communication unit 110. After that, the base station 200 determines, based on the measurement report, whether a handover should be executed or not for the user equipment 100.

(3-2. Exemplary Configuration of Base Station)

Figure 8:
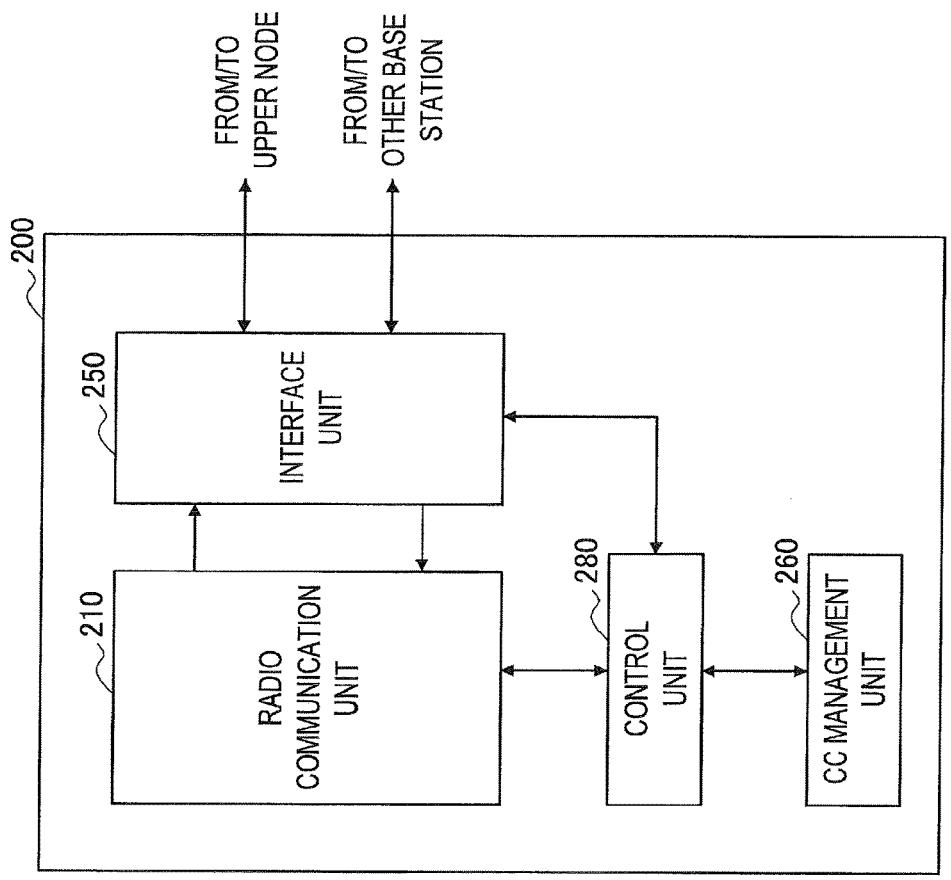
FIG. 8 is a block diagram showing an exemplary configuration of a base station according to the first embodiment.

FIG. 8 is a block diagram showing an exemplary configuration of the base station 200 according to the embodiment. Referring to FIG. 8, the base station 200 includes a radio communication unit 210, an interface unit 250, a component carrier (CC) management unit 260, and a control unit 280.

(Radio Communication Unit)

A specific configuration of the radio communication unit 210 may be similar to the configuration of the radio communication unit 110 of the user equipment 100 which is described above with reference to FIG. 7, although the number of component carriers to be supported, the requirements of processing performance or the like are different. The radio communication unit 210 performs a radio communication with the user equipment over a communication channel which is formed by aggregating a plurality of component carriers with use of the carrier aggregation technology.

(Interface Unit)

The interface unit 250 mediates a communication between the radio communication unit 210 or the control unit 280 and an upper node through the S1 interface illustrated in FIG. 5, for example. Further, the interface unit 250 mediates a communication between the radio communication unit 210 or the control unit 280 and another base station through the X2 interface illustrated in FIG. 5, for example.

(CC Management Unit)

The CC management unit 260 holds data that indicates which component carrier each user equipment is using for communication with respect to each of the user equipments belonging to the cell of the base station 200. Such data can be updated by the control unit 280 when an additional user equipment joins the cell of the base station 200 or when a connected user equipment changes its component carriers. Thus, the control unit 280 can recognize which component carrier the user equipment 100 is using by referring to the data held by the CC management unit 260.

(Control Unit)

The control unit 280 controls the overall functions of the base station 200 using the processing device such as a CPU or a DSP. For example, the control unit 280 allocates communication resources for data communication to the user equipment 100 and another user equipment, and then transmits scheduling information over a control channel of a component carrier corresponding to a scheduling information transmission method.

More specifically, the control unit 280 transmits scheduling information on communication resources in a component carrier following the straight scheduling method over a control channel of the same component carrier. Further, the control unit 280 transmits scheduling information on communication resources in an extension carrier over a control channel of a different component carrier which is a master.

Further, the control unit 280 controls a handover to another base station by the user equipment 100. More specifically, for example, when it is determined that a handover on an extension carrier needs to be performed, the control unit 280 first commands the user equipment 100 to perform a handover to a target base station on a component carrier to be operated according to straight scheduling method in the target base station. For example, it is assumed that the base station 200 and the target base station share a scheduling information transmission method for each component carrier (for each operating frequency band). In this case, for example, when it is determined that a handover on an extension carrier needs to be performed, the control unit 280 commands the user equipment 100 to execute a handover on a component carrier which is a master of the corresponding extension carrier before a handover on the extension carrier. Then, after completing a handover on the component carrier of the master, the control unit 280 commands the user equipment 100 to execute a handover on the extension carrier. Further, when another available component carrier is present, the control unit 280 may temporarily transmit scheduling information on the extension carrier over a control channel of another component carrier until the handover on the extension carrier is completed after the handover on the component carrier of the master starts. In addition, the control unit 280 causes the base station 200 to operate in the same way as the source base station or the target base station in the handover procedure described above with reference to FIG. 1.

(3-3. Flow of Process)

Figure 9:
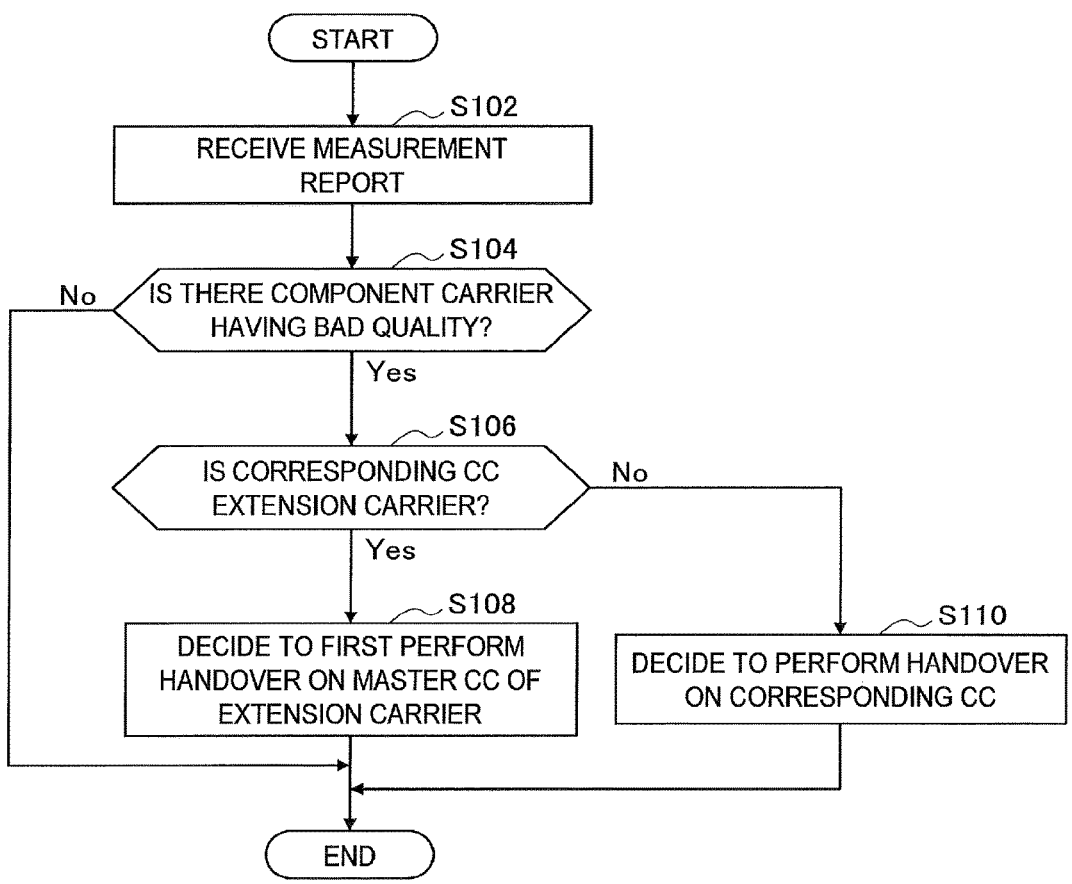
FIG. 9 is a flowchart showing an example of the flow of a determination process of a handover procedure by a base station according to the first embodiment.

FIG. 9 is a flowchart showing an example of the flow of a determination process of a handover procedure by the control unit 280 of the base station 200 according to the present embodiment.

Referring to FIG. 9, the control unit 280 receives a measurement report from the user equipment 100 through the radio communication unit 210 (step S102). Next, the control unit 280 determines whether or not there is a component carrier whose quality does not satisfy a predetermined criterion based on content of the measurement report (step S104). Here, when there is no component carrier whose quality does not satisfy a predetermined criterion, the process ends. However, when there is a component carrier whose quality does not satisfy a predetermined criterion, the process proceeds to step S106. Next, the control unit 280 determines whether or not the component carrier whose quality does not satisfy a predetermined criterion is a component carrier to be operated according to the cross scheduling method (step S106). Here, when the corresponding component carrier is a component carrier to be operated according to the cross scheduling method, the process proceeds to step S108. However, when the corresponding component carrier is not a component carrier to be operated according to the cross scheduling method, the process proceeds to step S110. In step S108, the control unit 280 decides to perform a handover on a component carrier which is a master of the corresponding component carrier before the component carrier to be operated according to the cross scheduling method (step S108). Meanwhile, in step S110, the control unit 280 decides a handover on a component carrier determined as having a quality that does not satisfy a predetermine criterion (step S110).

FIG. 10 is a sequence chart showing an example of the flow of a handover procedure according to the present embodiment. In a scenario of FIG. 10, it is assumed that a handover procedure is performed among the user equipment 100, the base station 200*a* serving as the source base station, and the base station 200*b* serving as the target base station. Further, a procedure (steps S2 to S14) up to the measurement in the user equipment in the general handover procedure illustrated in FIG. 1 is not particularly different, and thus a description thereof will not be made.

Referring to FIG. 10, the user equipment 100 first transmits a measurement report on a plurality of component carriers configuring a communication channel to the base station 200*a* (step S120). Next, the base station 200*a* determines whether or not a handover is necessary and a handover procedure for each component carrier based on the received measurement report as described above with reference to FIG. 9 (step S130).

In the scenario of FIG. 10, for example, it is assumed that a handover on a component carrier to be operated as an extension carrier is necessary. In this case, the base station 200*a* transmits a handover request message for requesting a handover on a component carrier which is a master of the corresponding component carrier to the base station 200*b* (step S144). The base station 200*b* that has received the handover request message determines whether or not the user equipment 100 can be accepted, for example, based on availability of a communication service offered by itself. Then, when it is determined that the user equipment 100 can be accepted, the base station 200*b* transmits a handover request confirm message to the base station 200*a* (step S146). The base station 200*a* that has received the handover request confirm message transmits a handover command on a component carrier of a master to the user equipment 100 (step S148). Thus, a handover on a component carrier of a master is executed among the user equipment 100 that has received the handover command, the base station 200*a*, the base station 200*b*, and the MME (step S150). In step S150, for example, synchronization with the target base station, random access to the target base station, transmission of a handover complete message, a route update, transmission of acknowledgement, and the like are performed, similarly to the process described above with reference to FIG. 1.

Next, the base station 200*a* transmits a handover request message for requesting a handover on a component carrier to be operated as an extension carrier to the base station 200*b* (step S164). The base station 200*b* that has received the handover request message determines whether or not the user equipment 100 can be accepted, for example, based on availability of a communication service offered by itself. Then, when it is determined that the user equipment 100 can be accepted, the base station 200*b* transmits a handover request confirm message to the base station 200*a* (step S166). The base station 200*a* that has received the handover request confirm message transmits a handover command on a component carrier to be operated as an extension carrier to the user equipment 100 (step S168). Thus, a handover on the corresponding component carrier is executed among the user equipment 100 that has received the handover command, the base station 200*a*, the base station 200*b*, and the MME (step S170).

Thereafter, when a handover on another component carrier is necessary, a handover is performed on each component carrier in the same way as the above-described procedure.

FIGS. 11A to 11D are explanatory views to further describe the scenario described above with reference to FIG. 10.

Figure 11A:
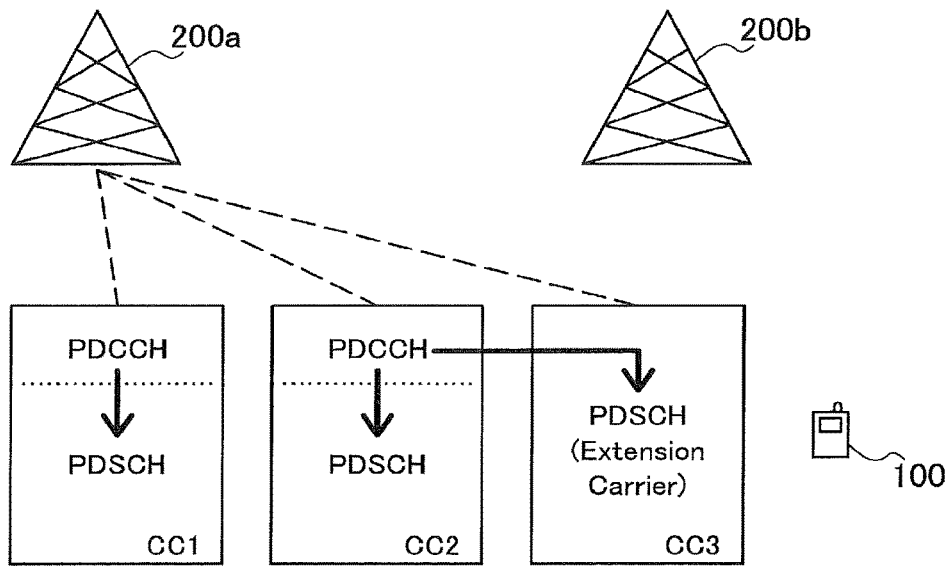
FIG. 11A is a first explanatory view to further describe a scenario described with reference to FIG. 10.

Referring to FIG. 11A, three component carriers CC1 to CC3 configuring a communication channel between the user equipment 100 and the base station 200*a* are depicted. At a point in time of FIG. 11A, the base station 200*a* functions as the serving base station of the user equipment 100. Further, among the three component carriers, the component carriers CC1 and CC2 are operated according to the straight scheduling method. The component carrier CC3 is operated according to the cross scheduling method. In this situation, when it is determined that a handover to the base station 200*b* is necessary on the component carrier CC3, a handover is first performed on the component carrier CC2 which is a master of the component carrier CC3. This is the same even when it is determined that a handover is necessary on the component carrier CC2.

Figure 11B:
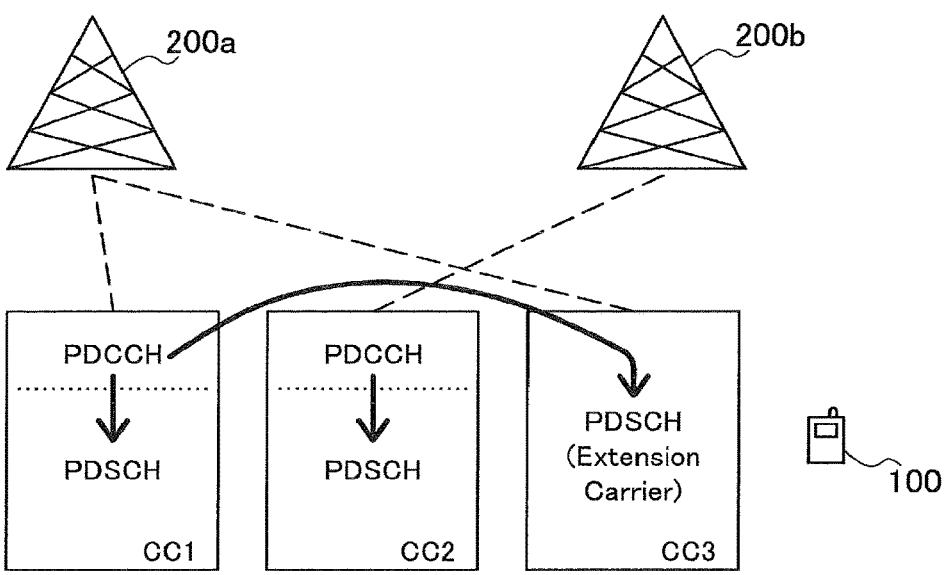
FIG. 11B is a second explanatory view to further describe a scenario described with reference to FIG. 10.

FIG. 11B shows a state after the user equipment 100 has performed a handover from the base station 200a to the base station 200b on the component carrier CC2 (after step S150 of FIG. 10 is completed). In FIG. 11B, among the three component carriers of the user equipment 100, the component carriers CC1 and CC3 remain connected to the base station 200a, and the component carrier CC2 remains connected to the base station 200b. Further, the component carrier CC2 is operated by the straight scheduling method even between the user equipment 100 and the base station 200b. Meanwhile, a master of the component carrier CC3 is temporarily changed to the component carrier CC1. For example, the change of the master of the extension carrier may be performed such that a change notice is transmitted from the base station 200a to the user equipment 100 (and another user equipment), and then the base station 200a changes a channel in which scheduling information on an extension carrier is to be included.

Figure 11C:
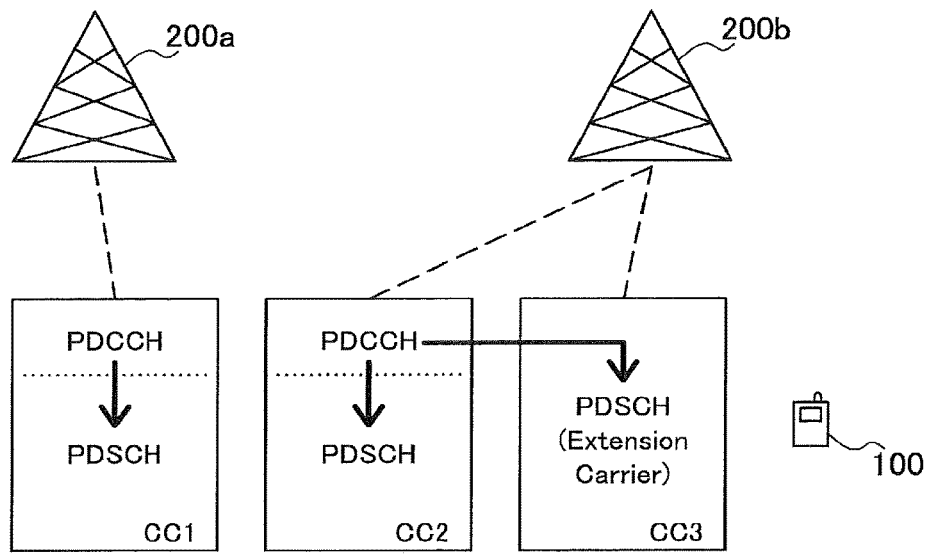
FIG. 11C is a third explanatory view to further describe a scenario described with reference to FIG. 10.

Further, FIG. 11C shows a state after the user equipment 100 has performed a handover from the base station 200a to the base station 200b on the component carrier CC3 (after step S170 of FIG. 10 is completed). In FIG. 11C, among the three component carriers of the user equipment 100, the component carrier CC1 remains connected to the base station 200a, and the component carriers CC2 and CC3 remain connected to the base station 200b. Further, the component carrier CC2 functions as the master of the component carrier CC3 in the communication channel between the user equipment 100 and the base station 200b.

Figure 11D:
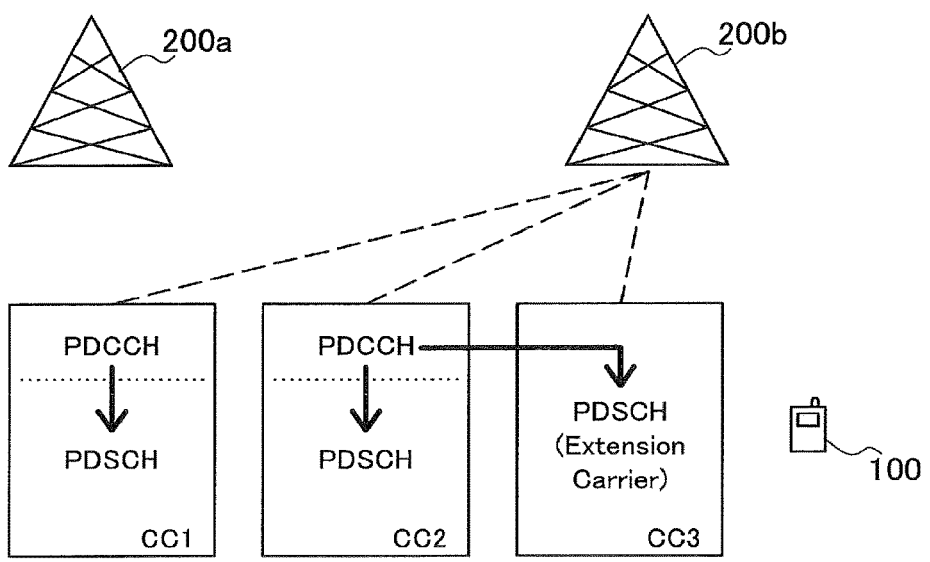
FIG. 11D is a fourth explanatory view to further describe a scenario described with reference to FIG. 10.

Further, FIG. 11D shows a state after the user equipment 100 has performed a handover from the base station 200a to the base station 200b on the component carrier CC1. In FIG. 11D, all of the three component carriers of the user equipment 100 remain connected to the base station 200b.

(3-4. Summary of First Embodiment)

The first embodiment of the present invention has been described so far with reference to FIGS. 6 to 11D. According to the present embodiment, in radio communication involving the carrier aggregation, when it is determined that a handover needs to be executed on an extension carrier following the cross scheduling method, a handover is first executed on a component carrier to be operated according to the straight scheduling method in the target base station. In this case, for example, a component carrier on which a handover is first executed is a component carrier functioning as a master of an extension carrier. Thereafter, a handover is performed on a component carrier to be operated according to the cross scheduling method in the target base station. In this sequence, a component carrier functioning as a master of an extension carrier and the extension carrier are consecutively handed over, and thus a risk that data loss will occur due to loss or mismatching of scheduling information is reduced or eliminated. Accordingly, a seamless handover can be implemented even under the circumstances in which the cross scheduling method is performed. Furthermore, in the present embodiment, a scheduling information transmission method of each component carrier need not be changed for a handover procedure, and thus the impact on a system is small.

4. Description of Second Embodiment

Next, a second embodiment of the present invention will be described with reference to FIGS. 12 to 14B.

(4-1. Exemplary Configuration of User Equipment)

Figure 12:
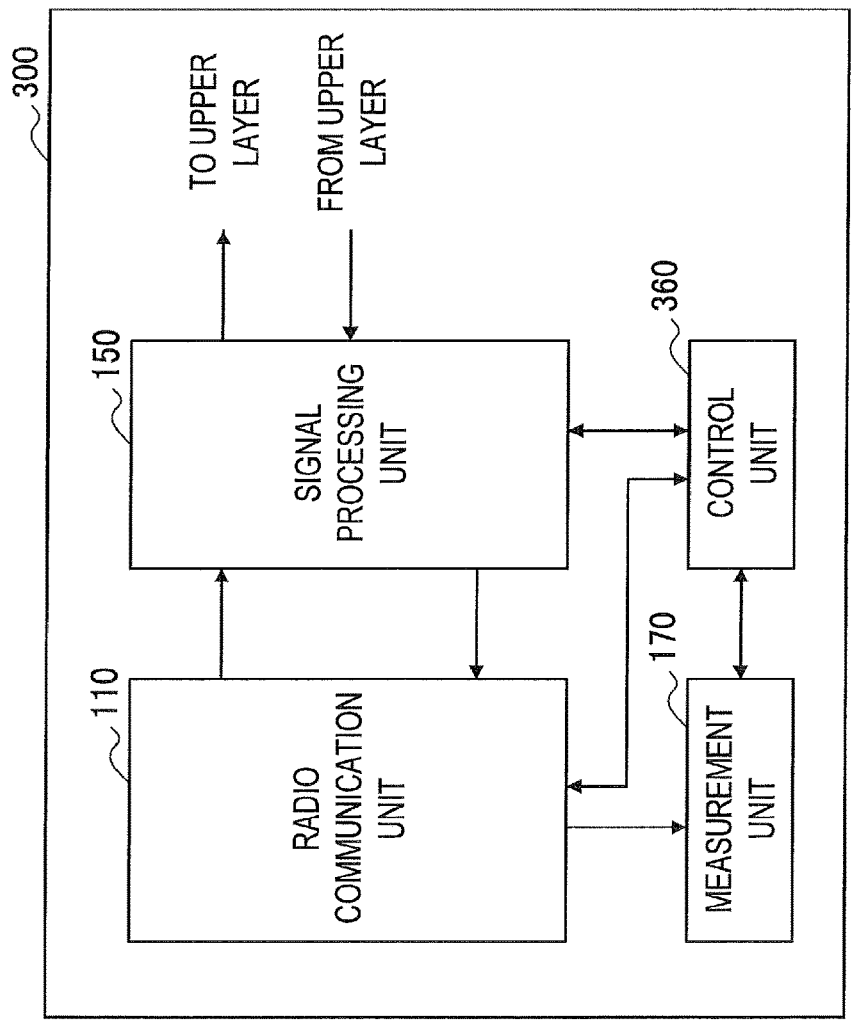
FIG. 12 is a block diagram showing an exemplary configuration of a user equipment according to a second embodiment.

FIG. 12 is a block diagram showing an exemplary configuration of a user equipment 300 according to the present embodiment. Referring to FIG. 12, the user equipment 300 includes a radio communication unit 110, a signal processing unit 150, a control unit 360, and a measurement unit 170.

(Control Unit)

The control unit 360 controls the overall functions of the user equipment 300 using the processing device such as a CPU or a DSP. For example, the control unit 360 controls a timing of data communication by the radio communication unit 110 for each component carrier according to scheduling information which is received from a base station 400 by the radio communication unit 110, similarly to the control unit 160 according to the first embodiment. Further, in the present embodiment, for example, when it is determined that the quality of an extension carrier operated by the cross scheduling method is being lowered based on the result of measurement made by the measurement unit 170, the control unit 360 transmits a change request of the scheduling information transmission method to the base station 400. This is done to prepare for a handover on a component carrier whose quality is decreasing by changing the scheduling information transmission method of the corresponding component carrier from the cross scheduling method to the straight scheduling method. Further, even when the control unit 360 does not request a change of the scheduling information transmission method, when a change of the scheduling information transmission method is notified of by the base station 400, the control unit 360 changes a component carrier operating method according to the corresponding notice. In addition, the control unit 360 causes the user equipment 300 to operate in the same way as the user equipment in the handover procedure described above with reference to FIG. 1.

(4-2. Exemplary Configuration of Base Station)

Figure 13:
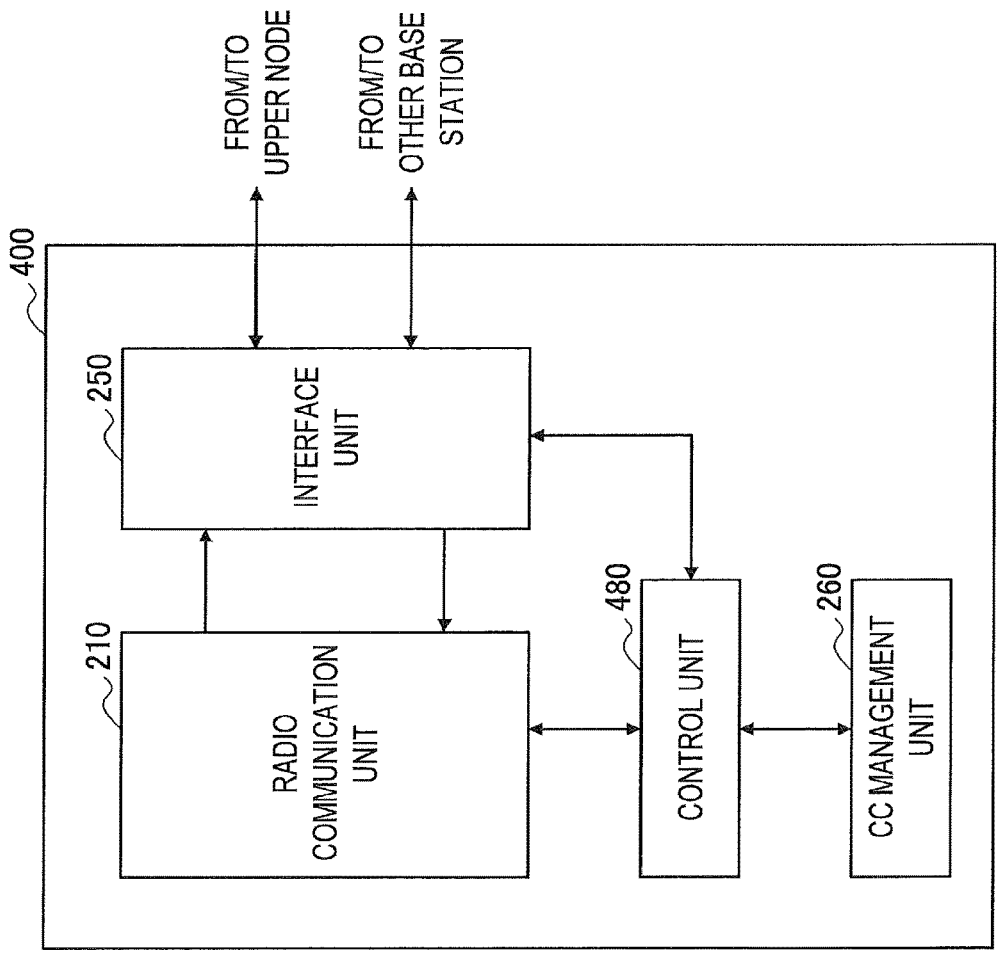
FIG. 13 is a block diagram showing an exemplary configuration of a base station according to the second embodiment.

FIG. 13 is a block diagram showing an exemplary configuration of the base station 400 according to the present embodiment. Referring to FIG. 13, the base station 400 includes a radio communication unit 210, an interface unit 250, a CC management unit 260, and a control unit 480.

(Control Unit)

The control unit 480 controls the overall functions of the base station 400 using the processing device such as a CPU or a DSP. For example, the control unit 480 allocates a communication resource for data communication to the user equipment 300 and other user equipment, and then transmits scheduling information over a control channel of a component carrier corresponding to a scheduling information transmission method, similarly to the control unit 280 according to the first embodiment.

Further, the control unit 480 controls a handover to another base station by the user equipment 300. For example, in the present embodiment, when it is determined that a handover on a component carrier which is an extension carrier needs to be executed, after the target base station confirms a request of a handover on the corresponding component carrier, the control unit 480 changes the scheduling information transmission method on the extension carrier from the cross scheduling method to the straight scheduling method. Further, the control unit 480 notifies the user equipment 300 of the change of the scheduling information transmission method. Further, when the change request of the scheduling information transmission method is received from the user equipment 300, the control unit 480 changes the scheduling information transmission method according to the corresponding request. Further, when the request from the user equipment 300 competes with another user equipment (for example, when it leads to a reduction in the throughput of communication of another user equipment with a high priority), the control unit 480 may deny the request from the user equipment 300. Thereafter, the control unit 480 executes a handover on a component carrier on which it is determined that a handover needs to be executed. In addition, the control unit 480 causes the base station 400 to operate in the same way as the source base station or the target base station in the handover procedure described above with reference to FIG. 1.

(4-3. Flow of Process)

Next, two scenarios of handover procedures according to the present embodiment will be described. In these scenarios, it is assumed that the handover procedure is performed among the user equipment 300, a base station 400a serving as the source base station, and a base station 400b serving as the target base station. Further, a procedure (steps S2 to S14) up to the measurement in the user equipment in the general handover procedure illustrated in FIG. 1 is not particularly different, and thus a description thereof will not be made.

Figure 14A:
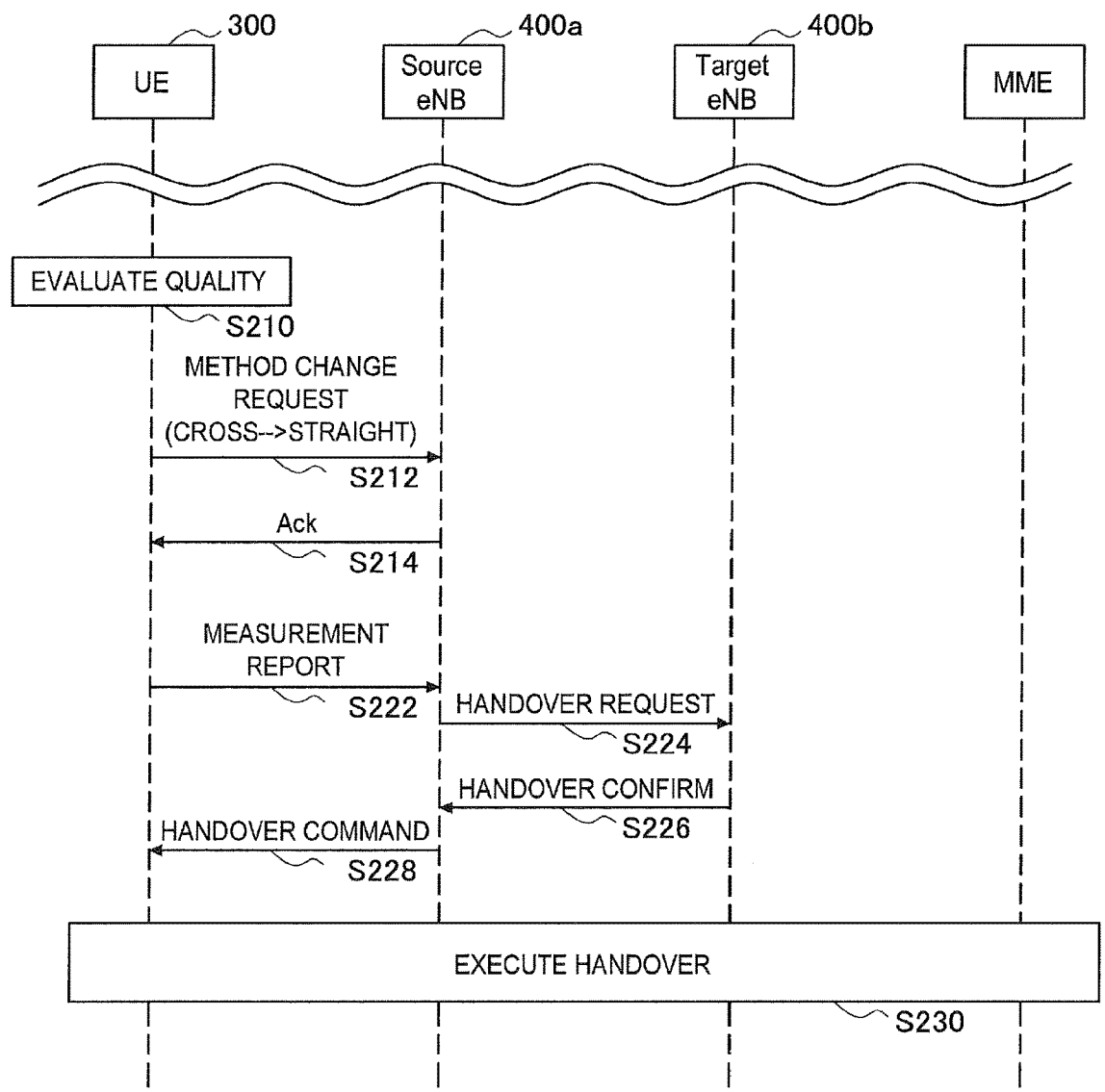
FIG. 14A is a sequence chart showing an example of the flow of a first scenario of a handover procedure according to the second embodiment.

FIG. 14A is a sequence chart showing an example of the flow of a first scenario of a handover procedure according to the present embodiment.

Referring to FIG. 14A, the user equipment 300 that has completed the measurement first evaluates the quality of a communication channel between the user equipment 300 and the base station 400a for each component carrier (step S210). Then, when it is determined that the quality of an extension carrier operated by the cross scheduling method is being lowered, the user equipment 300 transmits a change request to change the scheduling information transmission method from the cross scheduling method to the straight scheduling method to the base station 400a (step S212). Next, the base station 400a changes the scheduling information transmission method on the extension carrier according to the request, and transmits an acknowledgement (ACK) to the user equipment 300 (step S214). Next, the user equipment 300 transmits a measurement report to the base station 400a (step S222). Next, the base station 400a transmits a handover request message for requesting a handover on a component carrier on which it is determined that a handover is necessary based on the measurement report to the base station 400b (step S224). Here, for example, the component carrier on which it is determined that a handover is necessary is the component carrier whose scheduling information transmission method has been changed from the cross scheduling method to the straight scheduling method in steps S212 to S214. The base station 400b that has received the handover request message determines whether or not the user equipment 300 can be accepted, for example, based on availability of a communication service offered by itself. Then, when it is determined that the user equipment 300 can be accepted, the base station 400b transmits a handover request confirm message to the base station 400a (step S226). The base station 400a that has received the handover request confirm message transmits a handover command to the user equipment 300 (step S228). Thus, a handover is executed among the user equipment 300 that has received the handover command, the base station 400a, the base station 400b, and the MIME (step S230). In step S230, for example, synchronization with the target base station, random access to the target base station, transmission of a handover complete message, a route update, transmission of acknowledgement, and the like are performed, similarly to the process described above with reference to FIG. 1.

Figure 14B:
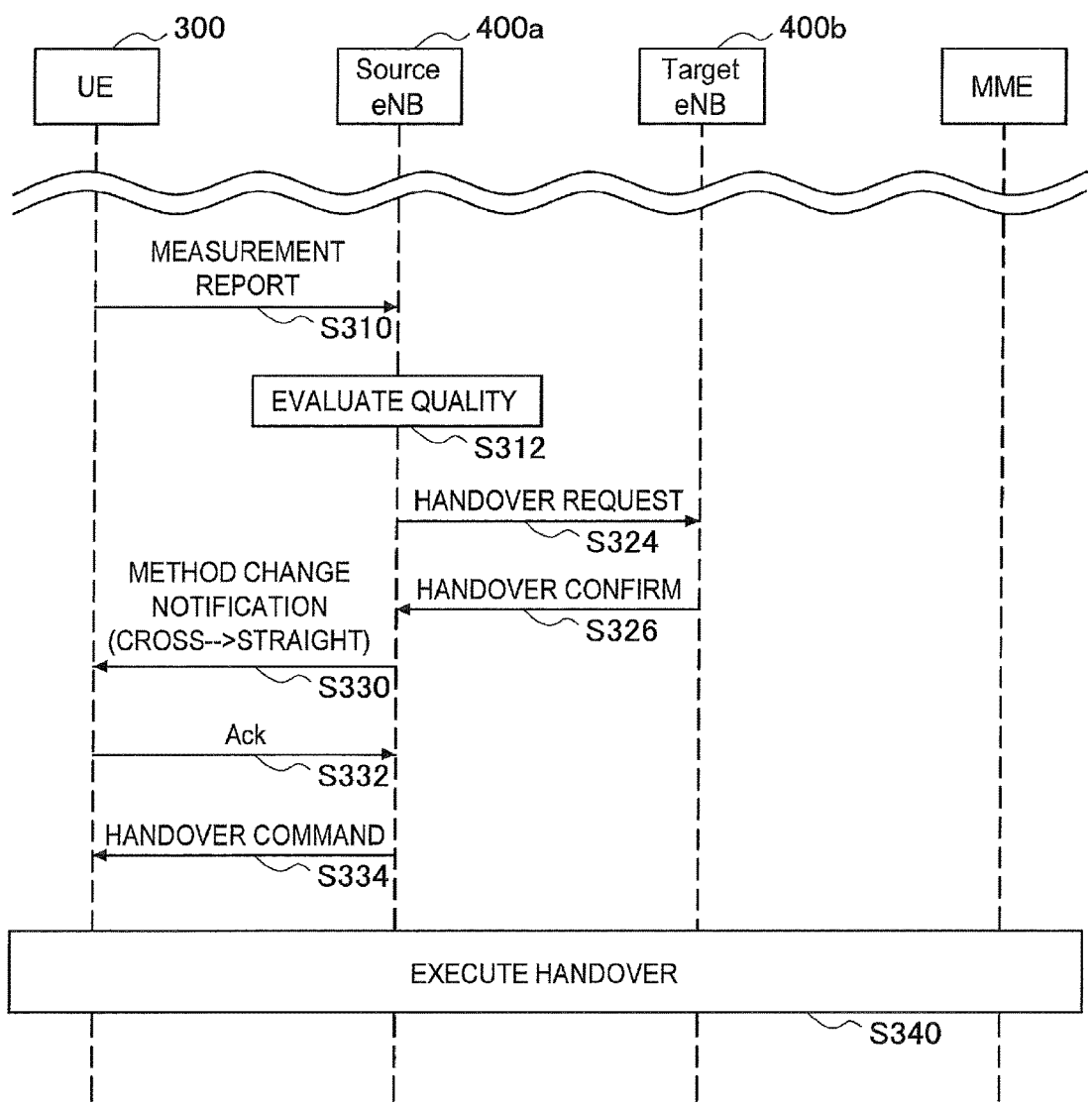
FIG. 14B is a sequence chart showing an example of the flow of a second scenario of a handover procedure according to the second embodiment.

FIG. 14B is a sequence chart showing an example of the flow of a second scenario of a handover procedure according to the present embodiment.

Referring to FIG. 14B, the user equipment 300 that has completed the measurement first transmits a measurement report to the base station 400a (step S310). Next, the base station 400a evaluates the quality of a communication channel between the user equipment 300 and the base station 400a for each component carrier (step S312). Next, the base station 400a transmits a handover request message for requesting a handover on a component carrier on which it is determined that a handover is necessary to the base station 400b (step S324). The base station 400b that has received the handover request message determines whether or not the user equipment 300 can be accepted, for example, based on availability of a communication service offered by itself. Then, when it is determined that the user equipment 300 can be accepted, the base station 400b transmits a handover request confirm message to the base station 400a (step S326). Next, when the component carrier on which a handover request has been confirmed is an extension carrier operated by the cross scheduling method, the base station 400a transmits a notice representing that the scheduling information transmission method on the corresponding extension carrier is to be changed from the cross scheduling method to the straight scheduling method to the user equipment 300 (step S330). Next, when acknowledgement is received from the user equipment 300 (step S332), the base station 400a changes the scheduling information transmission method on the extension carrier to the straight scheduling method. Then, the base station 400a transmits a handover command to the user equipment 300 (step S334). Thus, a handover is executed among the user equipment 300 that has received the handover command, the base station 400a, the base station 400b, and the MME (step S340).

(4-4. Summary of Second Embodiment)

The second embodiment of the present invention has been described so far with reference to FIGS. 12 to 14B. According to the present embodiment, in radio communication involving the carrier aggregation, when it is determined that a handover needs to be executed on an extension carrier following the cross scheduling method, the scheduling information transmission method on the corresponding extension carrier is changed to the straight scheduling method before a handover is executed. As a result, a component carrier on which a handover is first executed is operated according to the straight scheduling method. Accordingly, a risk that data loss will occur due to loss or mismatching of scheduling information is reduced or eliminated. Furthermore, in the present embodiment, since an extension carrier and a component carrier functioning as a master of the extension carrier need not be consecutively handed over, for example, when the quality of the component carrier of the master is good, a connection of the corresponding component carrier having a good quality with the source base station can be maintained.

5. Description of Third Embodiment

Next, a third embodiment of the present invention will be described with reference to FIGS. 15 to 17.

(5-1. Exemplary Configuration of User Equipment)

Figure 15:
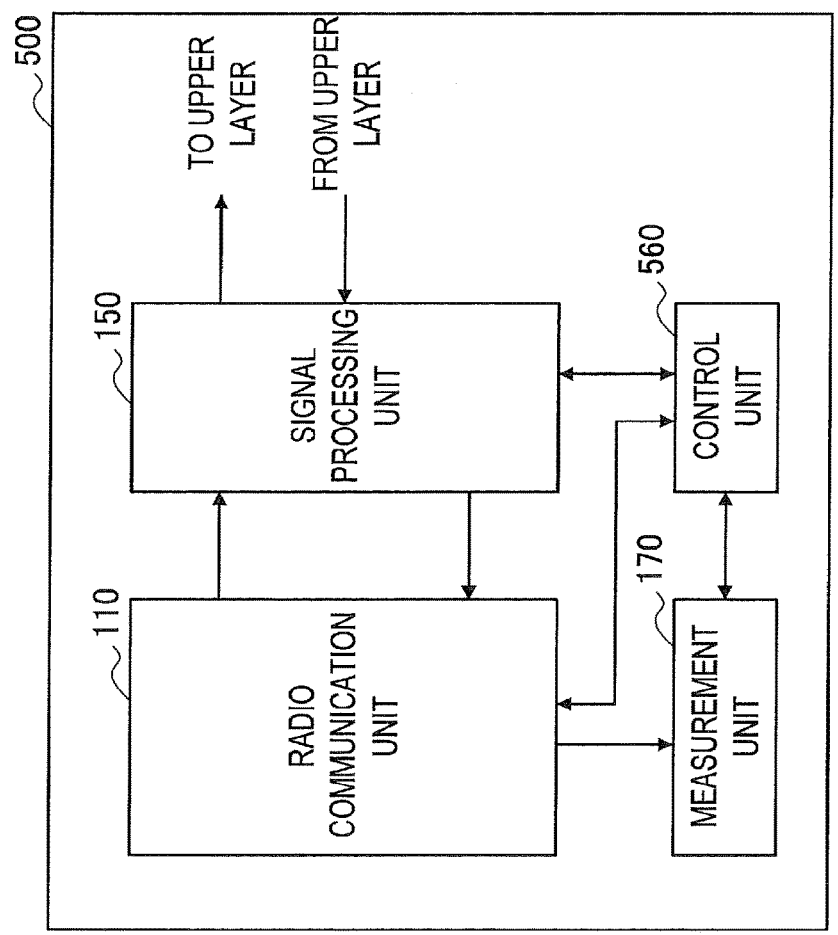
FIG. 15 is a block diagram showing an exemplary configuration of a user equipment according to a third embodiment.

FIG. 15 is a block diagram showing an exemplary configuration of a user equipment 500 according to the present embodiment. Referring to FIG. 15, the user equipment 500 includes a radio communication unit 110, a signal processing unit 150, a control unit 560, and a measurement unit 170.

(Control Unit)

The control unit 560 controls the overall functions of the user equipment 500 using the processing device such as a CPU or a DSP. For example, the control unit 560 controls a timing of data communication by the radio communication unit 110 for each component carrier according to scheduling information which is received from a base station 600 by the radio communication unit 110, similarly to the control unit 160 according to the first embodiment. Further, in the present embodiment, for example, when a handover command is received from the base station 600 on a component carrier operated according to the cross scheduling method, the control unit 560 performs access using a component carrier following the straight scheduling method when performing access to the target base station through the corresponding component carrier. In other words, the control unit 560 changes an operating method on an extension carrier from the cross scheduling method to the straight scheduling method at the time of access to the target base station. In addition, the control unit 560 causes the user equipment 500 to operate in the same way as the user equipment in the handover procedure described above with reference to FIG. 1.

(5-2. Exemplary Configuration of Base Station)

Figure 16:
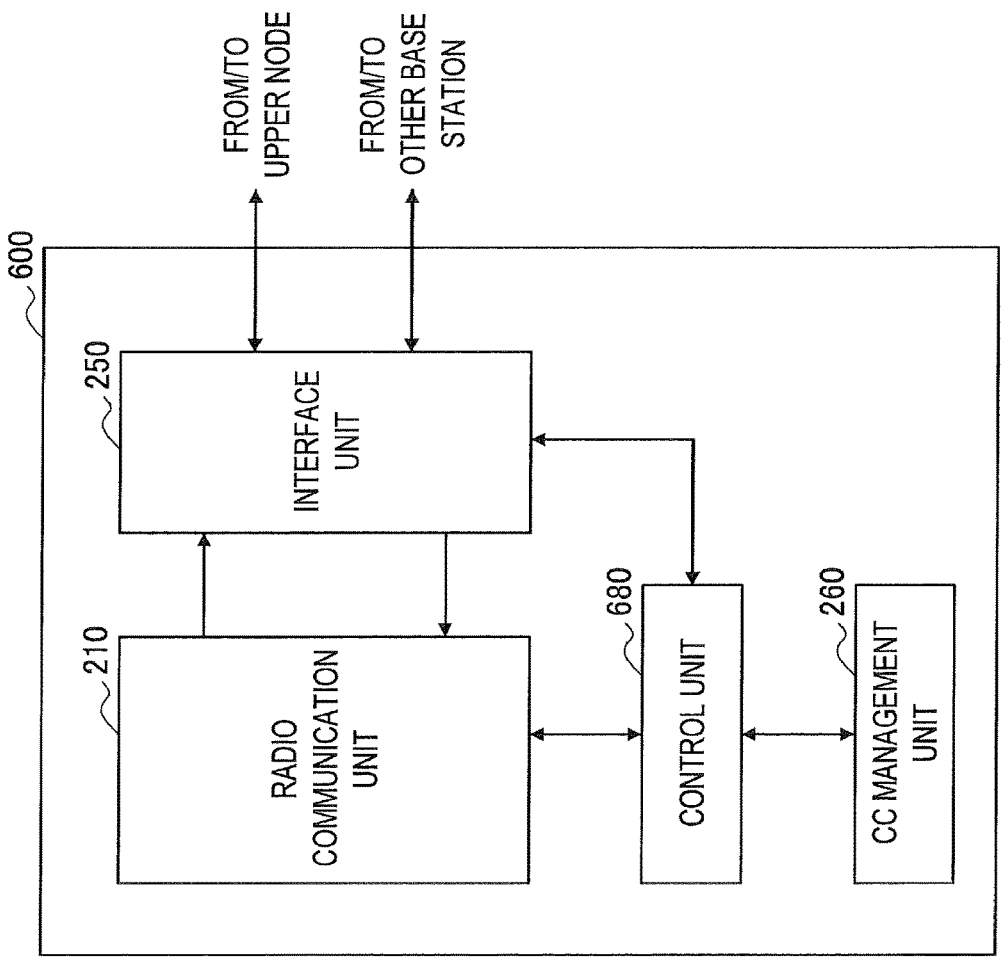
FIG. 16 is a block diagram showing an exemplary configuration of a base station according to the third embodiment.

FIG. 16 is a block diagram showing an exemplary configuration of the base station 600 according to the present embodiment. Referring to FIG. 16, the base station 600 includes a radio communication unit 210, an interface unit 250, a CC management unit 260, and a control unit 680.

(Control Unit)

The control unit 680 controls the overall functions of the base station 600 using the processing device such as a CPU or a DSP. For example, the control unit 680 allocates a communication resource for data communication to the user equipment 500 and another user equipment, and then transmits scheduling information over a control channel of a component carrier corresponding to a scheduling information transmission method, similarly to the control unit 280 according to the first embodiment.

Further, the control unit 680 controls a handover to another base station by the user equipment 500. For example, in the present embodiment, when it is determined that a handover on a component carrier which is an extension carrier needs to be executed, the control unit 680 detects a component carrier operated according to the straight scheduling method in the target base station. For example, the component carrier operated according to the straight scheduling method in the target base station can be detected by receiving system information which is transmitted through an X2 interface illustrated in FIG. 5 or transmitted over a broadcast channel from the target base station. Then, the control unit 680 transmits a handover command for causing an extension carrier on which it is determined that a handover needs to be executed to be handed over to a component carrier operated according to the straight scheduling method in the target base station to the user equipment 500. In addition, the control unit 680 causes the base station 600 to operate in the same way as the source base station or the target base station in the handover procedure described above with reference to FIG. 1.

(5-3. Flow of Process)

Figure 17:
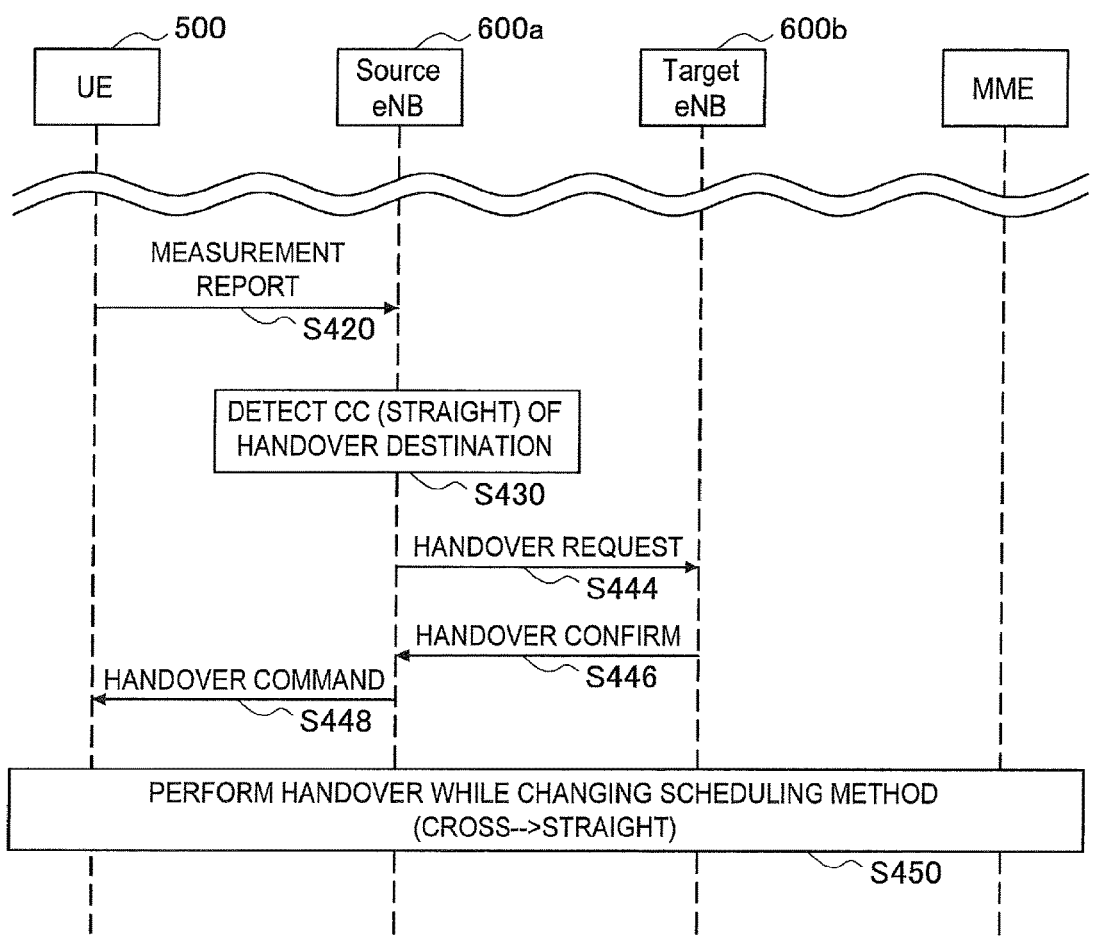
FIG. 17 is a sequence chart showing an example of the flow of a handover procedure according to the third embodiment.

FIG. 17 is a sequence chart showing an example of the flow of a handover procedure according to the present embodiment. In the scenario of FIG. 17, it is assumed that the handover procedure is performed among the user equipment 500, a base station 600a serving as the source base station, and a base station 600b serving as the target base station. Further, a procedure (steps S2 to S14) up to the measurement in the user equipment in the general handover procedure illustrated in FIG. 1 is not particularly different, and thus a description thereof will not be made.

Referring to FIG. 17, the user equipment 500 first transmits a measurement report on a plurality of component carriers configuring a communication channel to the base station 600a (step S420). Next, when it is determined that a handover needs to be executed on a component carrier which is an extension carrier based on the measurement report, the base station 600a detects a component carrier operated according to the straight scheduling method in the base station 600b (step S430). Next, the base station 600a transmits a handover request message for requesting a handover to the detected component carrier to the base station 600b (step S444). The base station 600b that has received the handover request message determines whether or not the user equipment 500 can be accepted, for example, based on availability of a communication service offered by itself. Then, when it is determined that the user equipment 500 can be accepted, the base station 600b transmits a handover request confirm message to the base station 600a (step S446). The base station 600a that has received the handover request confirm message transmits a handover command for causing an extension carrier on which it is determined that a handover needs to be executed to be handed over to a component carrier used in the base station 600b detected in step S430 to the user equipment 500 (step S448). Thus, a handover is executed among the user equipment 500 that has received the handover command, the base station 600a, the base station 600b, and the MME while changing the scheduling method from the cross scheduling method to the straight scheduling method (step S450). More specifically, for example, the user equipment 500 changes an operating frequency band of the extension carrier to a frequency band of the component carrier designated in the handover command, and makes an attempt to acquire synchronization with the base station 600b and make random access to the base station 600b. Then, when random access is successfully made, a handover complete message is transmitted from the user equipment 500 to the base station 600b, and a route is updated by the MME. Thereafter, the user equipment 500 can perform communication with another device over a new component carrier between itself and the base station 600b. At this time, since the new component carrier follows the straight scheduling method, the user equipment 500 performs communication via the base station 600b according to scheduling information on a control channel of the same component carrier.

(5-4. Summary of Third Embodiment)

The third embodiment of the present invention has been described so far with reference to FIGS. 15 to 17. According to the present embodiment, in radio communication involving the carrier aggregation, when it is determined that a handover needs to be executed on a component carrier following the cross scheduling method, a handover is executed on the corresponding component carrier. Further, in the target base station, after a handover is completed, the corresponding component carrier is operated according to the straight scheduling method. Accordingly, a risk that data loss will occur due to loss or mismatching of scheduling information is reduced or eliminated. Furthermore, in the present embodiment, since an extension carrier and a component carrier functioning as a master of the extension carrier need not be consecutively handed over, for example, when the quality of the component carrier of the master is good, a connection of the corresponding component carrier having a good quality with the source base station can be maintained.

As described above, according to the three embodiments described in this disclosure, by appropriately controlling a handover procedure of each component carrier, a handover can be performed with no data loss even under the circumstances cross scheduling can be performed.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

1 Radio communication system
100, 300, 500 User equipment
110 Radio communication unit (User equipment)
160, 360, 560 Control unit (User equipment)
200, 400, 600 Base station
210 Radio communication unit (Base station)
280, 480, 680 Control unit (Base station)

The invention claimed is:

1. A method for controlling a handover from a first base station to a second base station by a user equipment that performs radio communication over a communication channel formed by carrier aggregation of a plurality of component carriers, the method comprising:
transmitting, from the first base station to the user equipment, scheduling information of each component carrier of the plurality of component carriers respectively according to a scheduling information transmission method that is a cross scheduling method;
commanding, by the first base station, the user equipment to perform the handover of the communication channel formed by carrier aggregation of the plurality of component carriers;
causing transfer of a first component carrier of the plurality of component carriers in the first base station to a first transferred component carrier in the second base station, the first component carrier being operated according to the cross scheduling method; and
stopping, by the first base station, transmission of the scheduling information of the first component carrier of the plurality of component carriers in the first base station.

2. The method according to claim 1, further comprising:
receiving, by the first base station, measurement information from the user equipment; and
determining, by the first base station, whether the handover is necessary according to the measurement information transmitted from the user equipment.

3. The method according to claim 1, further comprising:
causing, after causing the transfer of the first component carrier, transfer of a second component carrier in the first base station to a second transferred component carrier in the second base station, the second component carrier being operated according to the straight scheduling method.

4. The method according to claim 3, further comprising:
causing, before causing the transfer of the second component carrier, transfer of a third component carrier of the plurality of component carriers in the first base station to a third transferred component carrier in the second base station, the third component carrier being operated according to the cross scheduling method, and
stopping, by the first base station, transmission of the scheduling information of the third component carrier of the plurality of component carriers in the first base station.

5. The method according to claim 1, thither comprising transmitting, from the second base station to the user equipment, the scheduling information of the first transferred component carrier in the second base station according to the straight scheduling method after the first component carrier is transferred to the first transferred component carrier in the second base station.

6. A user equipment, comprising:
a radio communication circuit that performs radio communication with a first base station over a communication channel formed by carrier aggregation of a plurality of component carriers;
a control circuit that controls a handover from the first base station to a second base station and
a quality measuring circuit that measures a channel quality of the communication channel between the user equipment and the first base station, wherein
the radio communication circuit is configured to
receive, from the first base station, scheduling information of each component carrier of the plurality of component carriers respectively according to a scheduling information transmission method that is a cross scheduling method, and
receive a command, from the first base station, to perform the handover of the communication channel formed by carrier aggregation of the plurality of component carriers, and
the control circuit is configured to
cause transfer of a first component carrier of the plurality of component carriers in the first base station to a first transferred component carrier in the second base station, the first component carrier being operated according to the cross scheduling method, and
stop reception of the scheduling information of the first component carrier of the plurality of component carriers in the first base station.

7. The user equipment according to claim 6, wherein the radio communication circuit transmits measurement information of the channel quality measured by the quality measuring circuit to the first base station.

8. The user equipment according to claim 6, wherein the control circuit is further configured to cause, after causing the transfer of the first component carrier, transfer of a second component carrier in the first base station to a second transferred component carrier in the second base station, the second component carrier being operated according to the straight scheduling method.

9. The user equipment according to claim 6, wherein the radio communication circuit is further configured to receive the scheduling information of the first transferred component carrier in the second base station according to the straight scheduling method after the first component carrier is transferred to the first transferred component carrier in the second base station.

10. A base station, comprising:
a radio communication circuit that performs radio communication with a user equipment over a communication channel formed by carrier aggregation of a plurality of component carriers; and a control circuit that controls a handover to another base station by the user equipment, wherein the radio communication circuit is configured to transmit scheduling information of each component carrier of the plurality of component carriers respectively according to a cross scheduling method, the control circuit is configured to command the user equipment to perform the handover of the communication channel formed by carrier aggregation of the plurality of component carriers, such that transfer of a first component carrier of the plurality of component carriers in the base station to a first transferred component carrier in the other base station is caused, the first component carrier being operated according to the cross scheduling method, and the control circuit is further configured to stop transmission of the scheduling information of the first component carrier of the plurality of component carriers in the base station.

11. The base station according to claim 10, wherein, after the transfer of the first component carrier is caused, transfer of a second component carrier in the base station to a second transferred component carrier in the other base station is caused, the second component carrier being operated according to the straight scheduling method.

12. A method for controlling a handover from a first base station to a second base station by a user equipment that performs radio communication over a communication channel formed by carrier aggregation of a plurality of component carriers, the method comprising:

receiving, by the user equipment from the first base station, scheduling information of each component carrier of the plurality of component carriers respectively according to a scheduling information transmission method that is a cross scheduling method;

measuring, by the user equipment, a channel quality of the communication channel formed by carrier aggregation of the plurality of component carriers;

transmitting, by the user equipment to the first base station, measurement information of the channel quality;

receiving, by the user equipment from the first base station, a command to perform the handover of the communication channel formed by carrier aggregation of the plurality of component carriers;

causing transfer of a first component carrier of the plurality of component carriers in the first base station to a first transferred component carrier in the second base station, the first component carrier being operated according to the cross scheduling method; and stopping, by the user equipment, reception of the scheduling information of the first component carrier of the plurality of component carriers in the first base station.

13. The method according to claim 12, further comprising:

causing, after causing the transfer of the first component carrier, transfer of a second component carrier in the first base station to a second transferred component carrier in the second base station, the second component carrier being operated according to the straight scheduling method.

* * * * *

UNITED STATES PATENT AND TRADEMARK OFFICE
CERTIFICATE OF CORRECTION

PATENT NO. : 10,368,280 B2
APPLICATION NO. : 15/144236
DATED : July 30, 2019
INVENTOR(S) : Hiroaki Takano It is certified that error appears in the above-identified patent and that said Letters Patent is hereby corrected as shown below:

In the Claims

Claim 12, Column 24, Lines 1-2, please delete the word "respectively".

Signed and Sealed this
Tenth Day of September, 2019

Andrei Iancu
*Director of the United States Patent and Trademark Office*